United States Patent
Okada

(10) Patent No.: US 6,826,517 B2
(45) Date of Patent: Nov. 30, 2004

(54) METHOD AND APPARATUS FOR SIMULATING MANUFACTURING, ELECTRICAL AND PHYSICAL CHARACTERISTICS OF A SEMICONDUCTOR DEVICE

(75) Inventor: Takako Okada, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 348 days.

(21) Appl. No.: 09/747,200

(22) Filed: Dec. 21, 2000

(65) Prior Publication Data

US 2002/0123872 A1 Sep. 5, 2002

(51) Int. Cl.$^7$ ............................................. G06F 17/50
(52) U.S. Cl. .................................. 703/2; 703/3; 716/4
(58) Field of Search ........................ 703/14, 2, 3, 13, 703/6; 257/510, 506; 716/2, 4

(56) References Cited

U.S. PATENT DOCUMENTS

| | | | | |
|---|---|---|---|---|
| 5,625,578 A | * | 4/1997 | Du Cloux et al. | 364/578 |
| 5,627,479 A | * | 5/1997 | Viscor et al. | 324/765 |
| 5,684,723 A | * | 11/1997 | Nakadai | 364/578 |
| 5,745,370 A | * | 4/1998 | Ohtsu et al. | 364/488 |
| 5,819,073 A | * | 10/1998 | Nakamura | 395/500 |
| 6,285,970 B1 | * | 9/2001 | Akiyama | 703/2 |
| 6,304,834 B1 | * | 10/2001 | Enda | 703/4 |
| 6,310,384 B1 | * | 10/2001 | Miura et al. | 275/510 |
| 6,618,837 B1 | * | 9/2003 | Zhang et al. | 716/4 |

OTHER PUBLICATIONS

Grondin, R.O. et al. (1999) "A review of global modeling of charge transport in semiconductors and full–wave electromagnetics" *IEEE Transactions on Microwave Theory & Techniques* 47(6):817–829.

Yee, K.S. (1966) "Numerical solution of initial boundary value problems involving Maxwell's equations in isotropic media" *IEEE Transactions on Antennas & Propagation* 14(3):302–307.

Witzig, A. et al. (1999) "Global modeling of microwave applications by combining the FDTD method and a general semiconductor device and circuit simulator" *IEEE Transactions on Microwave Theory & Techniques* 47(6):919–928.

* cited by examiner

Primary Examiner—Thai Phan
(74) Attorney, Agent, or Firm—Gray Cary Ware & Freidenrich LLP

(57) ABSTRACT

An electronic device simulator includes a three-dimensional lumped device model, a three-dimensional visco-elastic process simulation model and a material design model that are interlinked with each other. The three-dimensional lumped device element model comprises a Poisson's equation model, an electron continuity equation model, a hole continuity equation model, a Maxwell's equations model, an eddy current equation model, and an Ohm's law equation model. The simulator accounts for the three dimensional characteristics of the circuit to determine circuit performance.

12 Claims, 33 Drawing Sheets

FIG. 22

| YEAR OF FIRST PRODUCTION | 1997 | 1999 | 2002 | 2005 | 2008 | 2011 |
|---|---|---|---|---|---|---|
| DESIGN RULE (nm) | 250 | 180 | 130 | 100 | 70 | 50 |
| DRAM CAPACITY | 256M | 1G | -- | 8G | -- | 64G |
| CLOCK FREQUENCY (MHz) | 750 | 1200 | 1600 | 2000 | 2500 | 3000 |
| GATE LENGTH (nm) | 200 | 140 | 100 | 65 | 45 | 30-32 |
| MINIMUM CONTACT SIZE (nm) | 280 | 200 | 150 | 130 | 100 | 70 |
| OXIDE THICKNESS (nm) | 3-4 | 1.9-2.5 | 1.3-1.7 | 0.9-1.1 | <1.0 | <1.0 |
| SUPPLY VOLTAGE (V) | 1.8-2.5 | 1.5-1.8 | 1.2-1.5 | 0.9-1.2 | 0.6-0.9 | 0.5-0.6 |
| METAL MATERIAL (S) | AL-CU | CU | CU | CU | CU | CU |
| METAL LAYERS | 6 | 6-7 | 7-8 | 8-9 | 9 | 10 |

```
M1 4 3 5 0 NFET W=4U L=1U AS=15P AD=15P PS=11.5U PD=11.5U

.MODEL NFET NMOS
+ TOX=200E-8
+ CGBO=200P CGSO=600P CGDO=600P
+ CJ=200U CJSW=400P MJ=0.5 MJSW=0.3 PB=0.7
+ .....
```

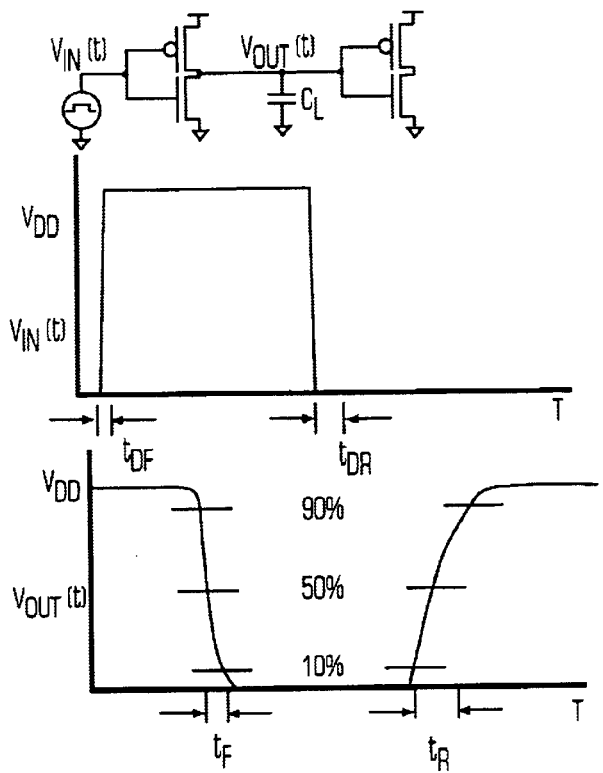

FIG. 12A

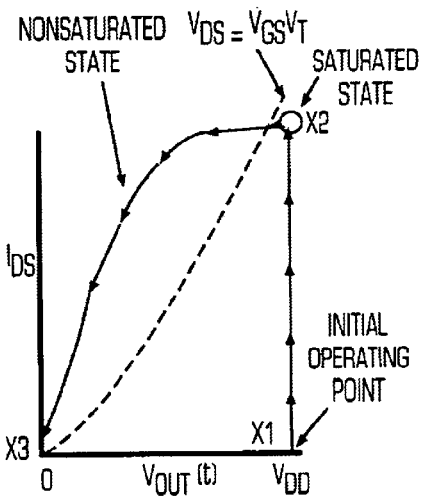

FIG. 12B

| PARAMETER | CAPACITANCE | | |
|---|---|---|---|
| | OFF | NON-SATURATED | SATURATED |
| $C_{GB}$ | $\dfrac{\varepsilon A}{T_{OX}}$ | 0 | 0 |
| $C_{GS}$ | 0 | $\dfrac{\varepsilon A}{2T_{OX}}$ | $\dfrac{2\varepsilon A}{3T_{OX}}$ |
| $C_{GD}$ | 0 | $\dfrac{\varepsilon A}{2T_{OX}}$ | 0 (FINITE FOR SHORT CHANNEL DEVICES) |
| $C_G = C_{GB} + C_{GS} + C_{GD}$ | $\dfrac{\varepsilon A}{T_{OX}}$ | $\dfrac{\varepsilon A}{T_{OX}}$ | $\dfrac{2\varepsilon A}{3T_{OX}} \rightarrow \dfrac{.9\varepsilon A}{T_{OX}}$ (SHORT CHANNEL) |

FIG. 13

A. CLOCK PERIOD = 1/FMAX
B. ENDO WIRING DELAY = $0.4 R_i C_i L^2$, $L = \sqrt{A}$
C. INTRINSIC GATE DELAY, ECTO LEVEL, L = 40 TRANS SPAN
D. ECTO WIRING DELAY = $R_i C_i L^2$, L =100 TRANS SPAN
E. TRANSISTOR TRANSIT TIME = $L_{OFF}/V_{OUT,ALL}$

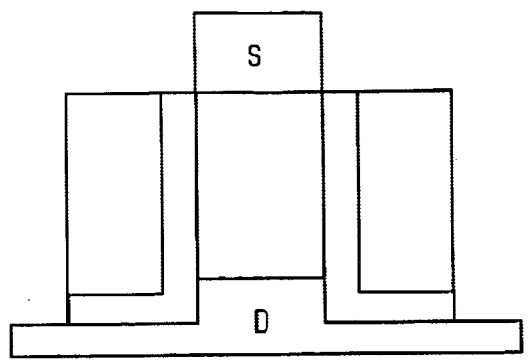
FIG. 16
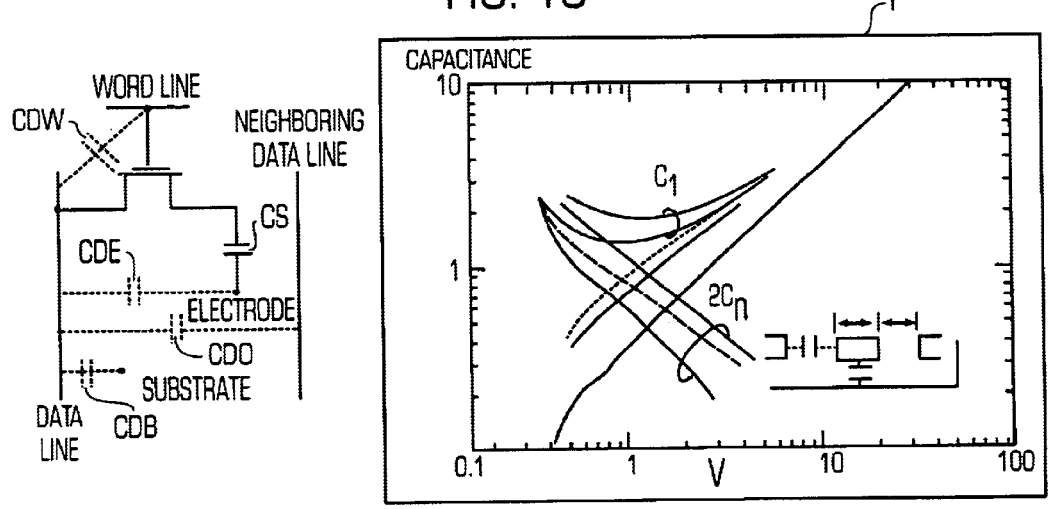
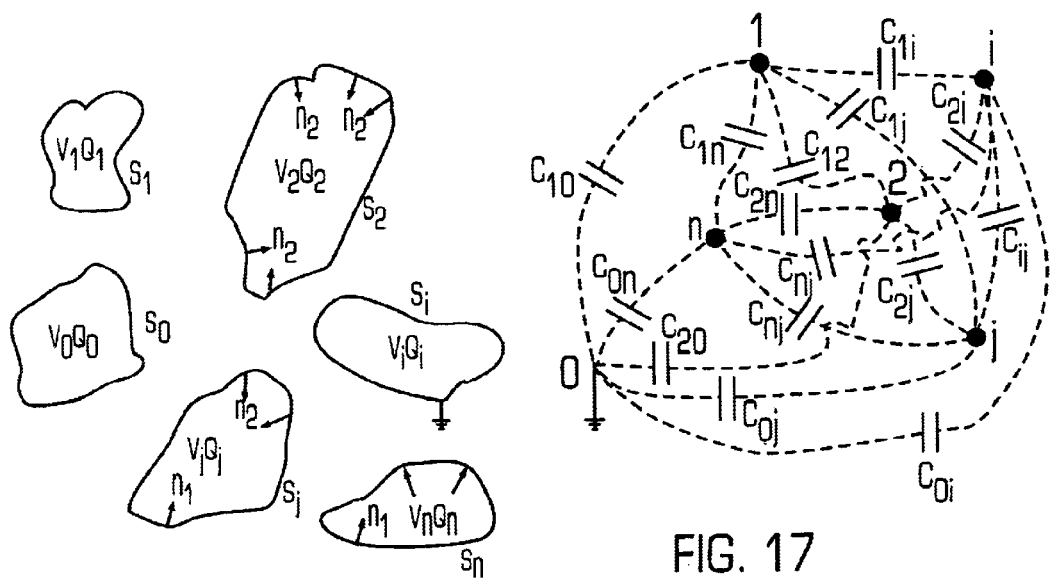
FIG. 17

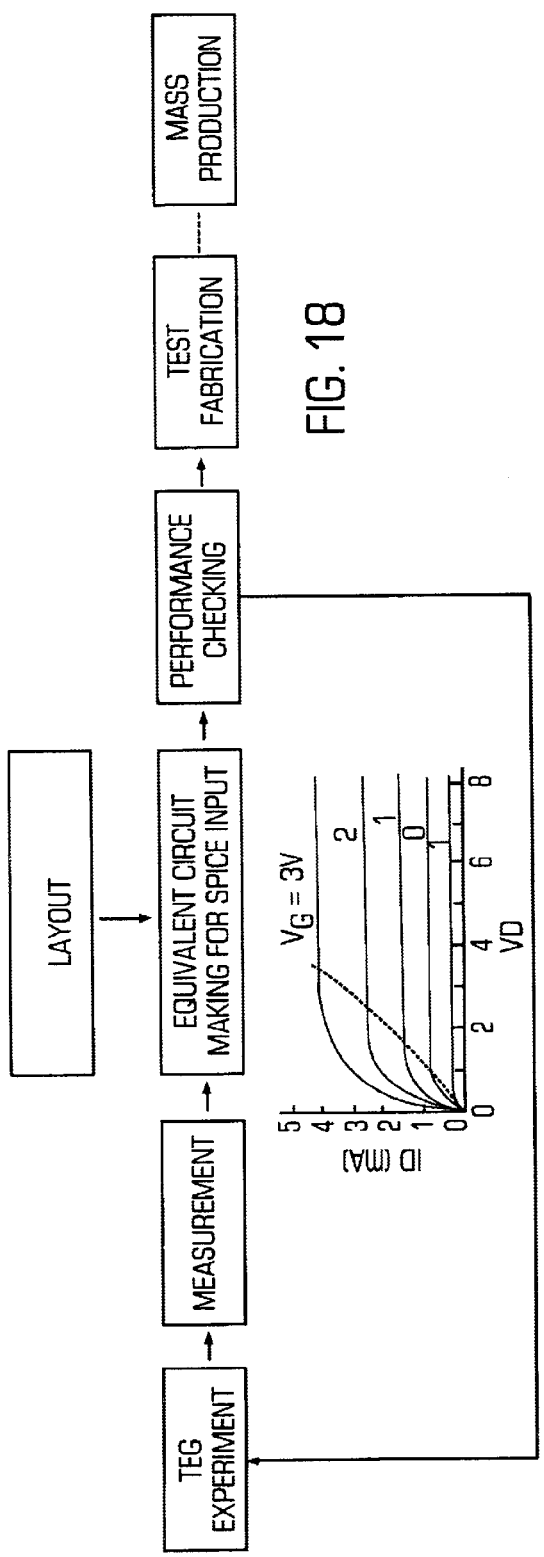
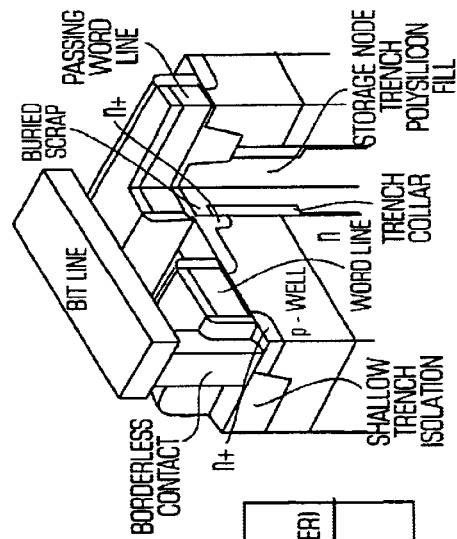
FIG. 18
FIG. 19

$$\frac{\vec{E}|^n}{n \cdot \Delta t} \quad \frac{\vec{H}|^{n+\frac{1}{2}}}{(n+\frac{1}{2})\Delta t} \quad \frac{\vec{E}|^{n+1}}{(n+1)\cdot \Delta t}$$
FIG. 24A
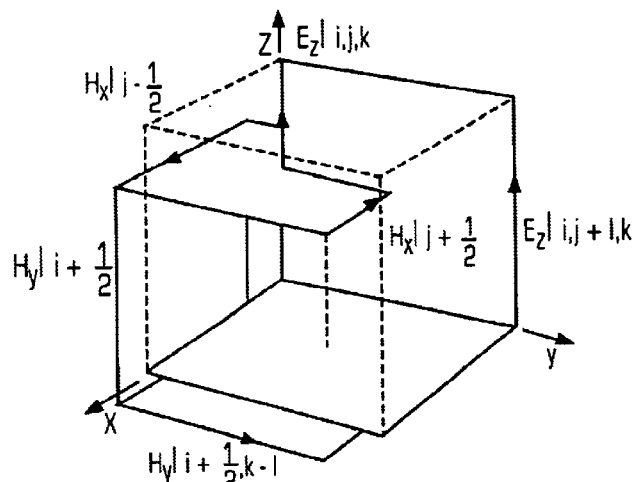
FIG. 24B
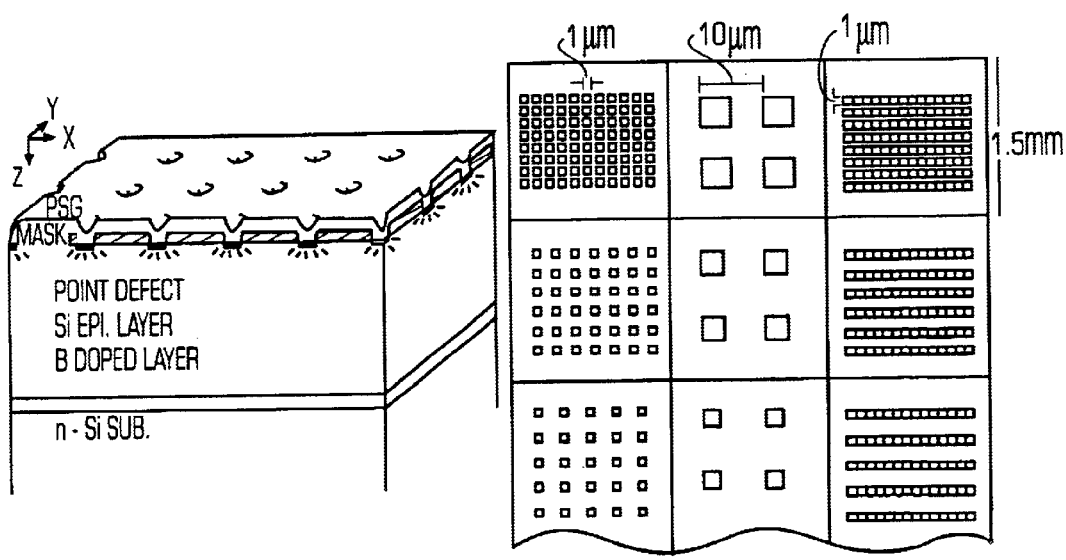
FIG. 25

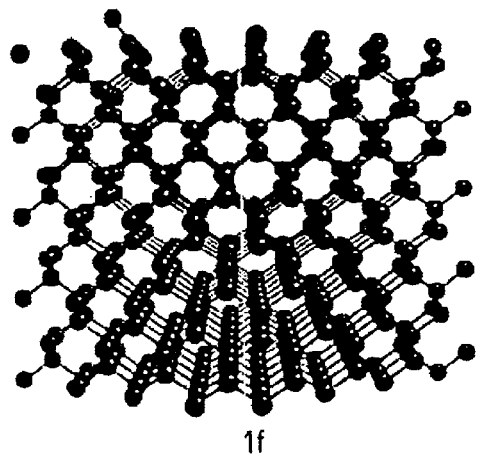
1f
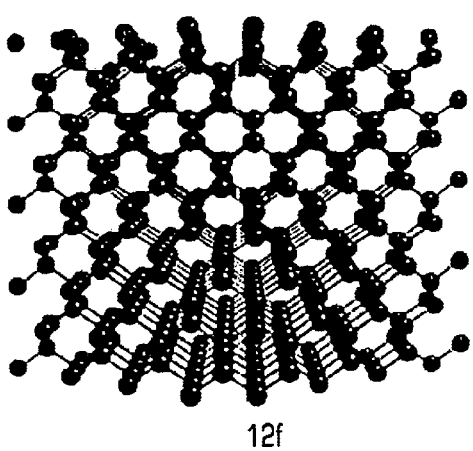
12f
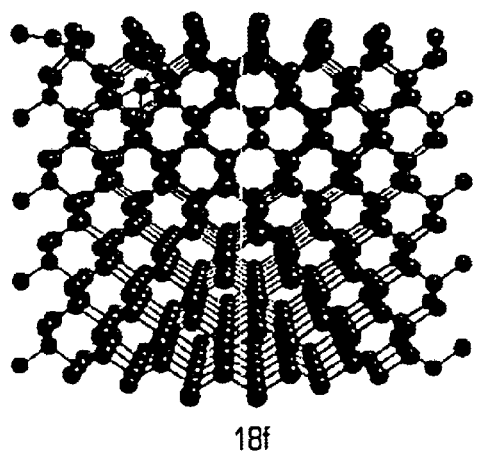
18f
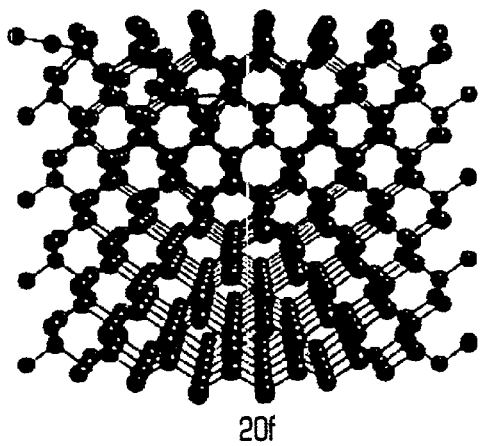
20f
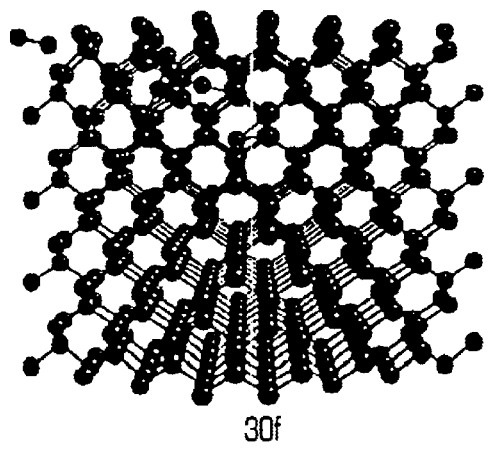
30f
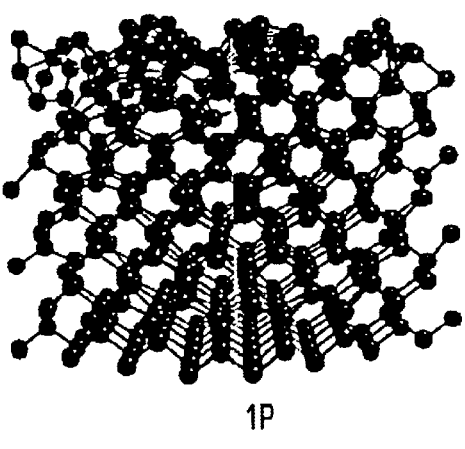
1P
FIG. 28

V(6) AND V(9) ARE VOLTAGES AT NODE 6 AND NODE 9 RESPECTIVELY.
IN THE COMPARATOR, W1 = W2 = W7 = 2.0μm, W3 = W4 = W5 = 1.0μm,
W6 = 4.1μm. ALL EFFECTIVE DEVICE LENGTHS ARE OF 1.1μm. VDD = 2V, VSS = -2V,
$V_N$ = 0V, IS = 13μm. INPUT $V_P$ GOES FROM -1 TO +2 VOLTS IN 2nS

| | CONDUCTOR | SEMICONDUCTOR | DIELECTRICS |
|---|---|---|---|
| TRANSIENT/AC CONDITION | $\bar{\nabla}\varepsilon\bar{E} = \rho_f$<br>$\frac{\partial \rho_f}{\partial t} = \bar{\nabla}\bar{J}$<br>$\bar{J} = \sigma\bar{E}$ | $\bar{\nabla}\varepsilon\bar{E} = \rho_f$<br>$\rho_f = q(p-n + N_D - N_A)$<br>$q\frac{\partial n}{\partial t} = \bar{\nabla}\bar{J}_n + qGR$<br>$q\frac{\partial p}{\partial t} = \bar{\nabla}\bar{J}_p + qGR$<br>$\bar{J}_n = q\mu_n\bar{E}n + qD_n\bar{\nabla}n$<br>$\bar{J}_p = q\mu_p\bar{E}p - qD_p\bar{\nabla}p$ | $\bar{\nabla}\varepsilon\bar{E} = \rho_f$<br>$\frac{\partial \rho_f}{\partial t} = \bar{\nabla}\bar{J}$<br>$\bar{J} = \frac{\partial \bar{D}}{\partial t} = \frac{\partial(\varepsilon\bar{E})}{\partial t}$ |
| STEADY STATE CONDITION | $\bar{\nabla}\varepsilon\bar{E} = 0$<br>$\bar{\nabla}\bar{J} = 0$<br>$\bar{J} = \sigma\bar{E}$ | $\bar{\nabla}\varepsilon\bar{E} = q(p-n + N_D - N_A)$<br>$\bar{\nabla}\bar{J}_n + qGR = 0$<br>$\bar{\nabla}\bar{J}_p - qGR = 0$ | $\bar{\nabla}\varepsilon\bar{E} = 0$<br>$\bar{J} = 0$ |

FIG. 40

METHOD AND APPARATUS FOR SIMULATING MANUFACTURING, ELECTRICAL AND PHYSICAL CHARACTERISTICS OF A SEMICONDUCTOR DEVICE

BACKGROUND OF THE INVENTION

1. Field of the Invention

The present invention relates to a semiconductor device manufacturing method, a semiconductor device, a semiconductor simulation method and a simulator, and more particularly to improve performance of lumped elements of devices and fabrication yield in scaled large scale integration (LSI), in conjunction with a computer aided design (CAD) tool.

2. Description of the Prior Art

Semiconductor design and fabrication have a wide variety of issues, relating to LSI fabrication, process design, system design, device design, and so on. Problems underlying the current process/device/system design phase are described.

First, a historical overview and the current status of the semiconductor industry and LSI device research and development phase are described. The semiconductor industry has continued to prosper as the result of continuous improvement of productivity and creative research throughout its history. It is believed that these trends will continue into the foreseeable future. It is instructive to quantitatively sketch the time evolution of high-tech consumer electronics in terms of product size. In the past decade, for example, the overall volume of mobile communications and personal computers has been reduced by an order of magnitude or more, with corresponding weight savings being realized. The number of transistors per microprocessor chip and per memory chip as a function of year is shown in FIG. 1. The time-dependent increase in the number of transistors on microprocessor and memory integrated circuit chips is shown in a logarithmic scale.

Regarding device size in the chips, the gate length of the devices and the isolation area size have been reduced as the number of transistors has increased. Roughly speaking, a typical design rule of a first phase of 256M DRAM (Dynamic Random Access Memory) has been around 0.25 microns. As a common language in the LSI industry and academia, the phrase 'design rule' is used as technology generation. 'LSI' is an integrated science and technology across large areas as its word literally says; circuit technology, device technology, mathematics, chemistry, physics, electrical engineering, computer simulation, and so on. So, a typical design 'rule' as technology generation specification is a very useful and convenient index in order to share and own a common meaning among engineers. FIG. 2 shows the typical technology parameters as a function of LSI generation. A design rule is shown in terms of DRAM capacity, year of the first production and so on. From FIG. 2, it is understood that the continual drive towards smaller feature size in device fabrication results in tighter design criteria and increased complexity of equipment used in semiconductor processing.

Basic research and developments have already started intensively for 0.13 microns or more scaled-down device/process design phase in universities, many LSI companies, and institutions all over the world. FIG. 3 show a cross section image of typical recent devices, which is appeared in a reference, J. G. Ryan, R. M. Geffken, N. R. Poulin, and J. R. Paraszczak, *IBM J. Res and Develop.* 39, 371 (1995).

Abbreviations of M1 to M5 are metal layers. At the bottom layer of FIG. 3, are MOS devices. There is a need to contact and interconnect (M1 to M4) among all of the semiconductor electrodes, i.e., source, drain, and gate, to other components and devices on the chip. The highest level (M5) is composed for bus-bars that carry current to chip contact pads.

FIG. 4 shows the number of metal layers as a function of technology generation. The signal delay among a large number of devices is minimized, so eventually a multi-layered structure of metallization was used. It can be seen from FIG. 4 that with reducing design rule, more metal layers are needed. The increase of the integration density, while maintaining the same RC signal delay leads to a strong increase of the number of the metal layers. This trend is mitigated by introducing new materials. Historically, $SiO_2$ has been well adopted for passivation films and interlayer dielectric films, and aluminum has also been well accepted as an interconnect metal. In FIG. 4, some of the improvements are also presented; such as introducing $Cu/SiO_2$, and some low epsilon materials. As overviewed above, the semiconductor industry has continued to prosper as the result of continuous improvement of productivity and creative research throughout its history. Also intensive research and developments have already started for 0.17 micron or more scaled-down device/process design phase.

As background, the LSI fabrication process is described. The LSI fabrication process has been composed basically of diffusion, silicidation, oxidation, chemical vapor deposition (CVD), ion implantation, etching and so-forth. These processes have been done repeatedly on semiconductor silicon substrates.

Before this LSI device fabrication, photomasks are made based on desired design rules. The design rules provide a necessary communication link between circuit designer and process engineer during the manufacturing phase. The main objective associated with layout rules is to obtain a circuit with optimum yield (functional circuit versus nonfunctional circuits) in as small an area as possible without compromising the reliability of the circuit. In general, design rules have represented the best possible compromise between performance and yield. The more conservative the rules are, the more likely it is that the circuit will function. However, the more aggressive the rules have been, the greater the probability of improvements in circuit performance. This improvement has been at the expense of yield. Based on these huge efforts, LSI has been continuously prosperous up to now.

Computer simulation tools for reducing time-around-time in trial and error phase are described. FIG. 5 shows an overview of the process flow of the simulator SUPREM (Stanford University Program for IC Process Engineering Models) which is one of the most famous and widely used simulators. Oxidation, diffusion, ion implantation, etching processes which are mentioned above, have been implemented in computer simulation programs based on chemical/physical models as subroutines. Most of the trial and error in research and development phase are done in computer programs. One can estimate and predict easily impurity profiles and final device structure in advance of actual fabrication. Once some impurity profiles are obtained in the device, then, device characteristics can also be calculated. FIG. 6(*a*) shows a three-dimensional graph of the potential plotted from a conventional device simulation solution based on estimated impurity profiles. Moreover, FIG. 6(*b*) shows a graph of subthreshold current in the simulated MOSFET (metal oxide semiconductor field effect transistor). So, eventually, the device characteristic for individual unit device can be estimated from an input process sequence. These CAD tools such as SUPREM to have now been indispensable in LSI fabrication lines.

FIG. 7 is a flow chart showing a typical conventional design process phase for an analog integrated circuit for telecommunications. Here, the 'simulation' is also seen. The task of designing an analog or digital integrated circuit includes many steps. FIG. 7 illustrates the general approach to the design of an integrated circuit. The major steps in the conventional design process are:

1) definition,
2) synthesis or implementation,
3) simulation or modeling,
4) geometrical description,
5) simulation including the geometrical parasitics,
6) fabrication, and
7) testing and verification.

The circuit designer is responsible for all of these steps except fabrication. The first major task is to define and synthesize the design. This step is crucial since it determines the performance capability of the design. When this task is completed, the designer must be able to confirm the design before it is fabricated. This leads to the second major task—using simulation methods to predict the performance of the circuit. At this point, the circuit designer may iterate using the simulation results to improve the circuit's performance. Once satisfied with this performance, the designer can attack the third major task—a geometrical description (layout) of the circuit. This geometrical description typically consists of a computer database of variously shaped rectangles or polygons (in the x-y plane) at different levels of space (in the z-direction); the layout is intimately connected with the electrical performance of the circuit. Once the layout is finished, it is necessary to include the geometrical effects in a second simulation. If the results are satisfactory, the circuit is ready for fabrication. Then the designer is faced with the last major task—determining whether the fabricated circuit meets the design specifications. If the designer has not carefully considered this step in the overall design process, it is often impossible to test the circuit and determine whether or not the specifications have been met.

So, it is understood that 'simulation' has now been inevitable in LSI manufacturing phase. Computer programs that simulate the performance of an electronic circuit provide a simple, cost-effective way of confirming the intended operation prior to circuit performance. Such computer programs have revolutionized the electronics industry, leading to the development of today's high-density monolithic circuit schemes such as VLSI (Very Large Scale Integration).

As background, the simulator named SPICE (Simulation program with integrated circuit emphasis) is now described. One of the typical standard manuals is SPICE second edition by G. W. Roberts & A. S. Sedra, Oxford University Press (1997), ISBN 0-19-510842-6. The SPICE, the de facto industrial standard for computer-aided circuit analysis, was developed in the early 1970s at the University of California, Berkeley. Although other programs for computer-aided circuit analysis exist and are used by many different electronic design groups, SPICE is the most widespread. Until recently, it was largely limited to mainframe computers on a time-sharing basis, but today various versions of SPICE are available for personal computers. In general, these other programs use algorithms slightly different from SPICE's for performing the circuit simulations, but many of them adhere to the same input description, elevating the SPICE input syntax to a programming language.

Now, a current circuit simulation methodology is described. FIG. 8 shows a typical MOSFET call in a SPICE simulator. The SPICE netlist fragment specifies an n-channel transistor element card M1, which uses an NMOS model called NFET. The terminal connections specify the drain is connected to node 4, the gate is connected to node 3, the source is connected to node 5, and the substrate is connected to node 0. , M1 is a 4 microns (W=4U) wide by 1 micron (L=1U) long transistor with source and drain areas of 15 square microns (AS=15P, AD=15P). The source and drain peripheries are 11.54 microns (PS=11.5U, PD=11.5U). The start of the MODEL statement is signified by the MODEL line. The second line on the model card specifies the thin-oxide thickness (TOX=200E-8). This allows SPICE to calculate the voltage-dependent gate capacitance. The maximum capacitance values is $$C_g = W \times L \times C_{ox} = 4 \times 1 \times 17 \times 10^{-4} \text{ pF} = 0.0068 \text{ pF}$$

As described above, a MOS structure is created by superimposing a number of layers of conducting, insulating, and transistors forming materials. It has been further demonstrated that in a conventional silicon gate process, a MOS device requires a gate-forming region and a source/drain-forming region, which consists of diffusion, poly silicon, and metal layers. Each layer has both a resistance and a capacitance that are fundamental components in estimating the performance of a circuit or system. The metal layers also have inductance characteristics that are important when considering I/O (input output) behavior but usually assumed to be negligible for most on-chip circuits.

Models are discussed that assist in the understanding of system behavior and that provide the basis whereby systems performance, in terms of signal delays and power dissipation, can be estimated from a simulation viewpoint. The issues to be described herein are:

resistance, capacitance, and inductance calculations,
delay estimations,
determination of conductor size for power and clock distribution,
power consumption,
charge sharing mechanism,
design margining,
reliability,
effects of scaling, so-on The resistance of a uniform slab of conducting material may be expressed as $$R = (\rho/t)(l/w)$$

where $\rho$=resistivity, t=thickness, l=conductor length, and w=conductor width. The expression may be written as $R = R_s(l/w)$(ohms) where $R_s$ is the sheet resistance having units of $\Omega$/square.

Many times during the course of a layout, nonrectangular shapes are used (for instance, the corners of wires). The resistance of these shapes requires more elaborate calculations than that for simple rectangular regions. One method of calculating the resistance is to break the shape in question into simple regions, for which the resistance may be calculated, as shown in FIG. 9. This has been an innovative work, which was published in *IEEE Transactions on computer-aided design*, vol. CAD-2, No.3(1983)145 by Mark Horowitz and Robert W. Dutton. However, the device structure has been now not so smooth or plain (described below). So, it is now very difficult to estimate realistically the value of resistance.

FIG. 10 shows the typical circuit symbols for parasitic capacitance in SPICE modeling. For convenience for calculation, equivalent circuit models have been implemented in SPICE. The values, $C_{gd}$, $C_{db}$, $C_{sb}$, $C_{gb}$, $C_{gs}$, are capacitance between gate and drain, capacitance between drain and bulk, capacitance between source and bulk, capacitance between gate and bulk, capacitance gate and source, respectively. These values are quite important for precise estimation for timing simulation in SPICE. However, these have been adjustable values. This is one of the reasons why future LSI developments for 0.07 microns or more scaled have now been retarded.

Contacts and vias also have a resistance associated with them that is dependent on the contacted materials and proportional to the area of the contact. This is another reason why future LSI developments for 0.07 microns or more scaled have now been retarded.

As described above, the dynamic response (e.g., switching speed) of MOS systems is strongly dependent on the parasitic capacitance associated with the MOS device and interconnection capacitance that are formed by metal, poly, and diffusion wire (often called 'runners') in concert with transistor and conductor resistances. The total load capacitance on the output of a CMOS gate is the sum of:

gate capacitance (of other inputs connected to the output of the gate), diffusion capacitance (of the drain regions connected to the output), and routing capacitance (of connections between the output and other inputs)

Understanding the source of parasitic loads and their variation is essential in the design process, where system performance in terms of the speed of the system form part of the design specification. FIG. 11 shows typical total gate capacitance of a MOS transistor as a function of Vgs. From these figures, it is seen that the capacitance vales also depend on Vds. FIG. 12 shows switching characteristics for a CMOS inverter; FIG. 12a shows circuit waveforms; FIG. 12b shows trajectory of n-transistor operating point during switching. FIG. 13 shows the conventional approximation of intrinsic MOS gate capacitance conversion.

A factor that emerges from equation, $R=(\rho/t)(l/w)$ is that, as the diffusion area is reduced (through scaling, discussed below), the relative contribution of the peripheral capacitance becomes more important.

Other design phase difficulties exist. The propagation of a signal along a wire depends on many factors, including the distributed resistance and capacitance of the wire, the impedance of the driving source, and the load impedance. For very long wires with appreciable sheet resistance propagation delays caused by distributed resistance, capacitance (RC) in the wiring layer can dominate. This is indeed also related to the content in FIG. 4, described above. The switching speed of CMOS gates is limited by the time taken to charge and discharge the load capacitance $C_L$. An input transition results in an output transition that either charges $C_L$ toward $V_{DD}$ or discharges $C_L$ toward $V_{SS}$.

Before proceeding, however, some terms are defined:

rise time, $t_r$, fall time, $t_f$, delay time $t_d$,

Typical delay times for various technology nodes are illustrated in FIG. 14, and the approximations of intrinsic MOS gate capacitances are listed in FIG. 13. In FIG. 14, the x-axis shows 'technology nodes', which are similar to the above-mentioned 'design rule'. FIG. 14 shows that the clock period ("A"), intrinsic gate delay ("C"), ecto wiring delay ("D") and transistor transit time ("E") components decrease as the technology node decreases, while endo wiring delay ("B") component increases. Even if a Cu/low k material is adopted, "B*" decreases lower than "B"; however, the component "B*" still dominates in more scaled devices. In order to continue to capture the productivity and performance advantages of scaled transistors, (such as matters shown in FIG. 1), the wiring imperative for GSI (gigascale integration) is quite succinct: 'keep interconnects short'. For the most part, this has not been the approach of the part due to the predominant influence of transistors on the key theoretical and practical limits on microchips. This era has concluded and future projections strongly indicate the necessity for 'interconnect centric' chip architectures for GSI. In other words, designing of wiring layout and wiring materials becomes an important issue more than transistor designing. The implications of this technological inversion are profound and should serve to foster radical changes in future architecture.

Now the difficulty of estimating periphery capacitance is described. FIGS. 15(a) through 15(d) show recent conventional DRAM cell structures, which have appeared in IBM Research and Development vol.39, No.1/2 (1995). From these figures, it can be seen that technology has now shifted in a three-dimensional stacked regime. Moreover, FIG. 16 shows a cross-sectional schematic structural view of a conventional pillar-shaped vertical transistor with surrounding gate. Here, it is easily understood that it would be very difficult to estimate overlap capacitance or peripheral capacitance and the like. So, a precise estimation of delay time or system design is not obtained in the model.

FIG. 17 shows a conventional peripheral capacitance estimation procedure and modeling in a TCAD (Technological Computer Aided Design) tool. The phase from TEG (test element group) test fabrication to check the system performance is still very much time-consuming. In order to verify the design or to evaluate reliability of product LSI, TEG is used together with LSI product. Because, in the product LSI, electric characteristics of each device cannot be measured directly. TEG consists of many components of product LSI such as elemental circuit, devices, conductors, and so-forth. Moreover, conventional TCAD now faces a huge barrier not previously experienced. Generally, 'TCAD' signify specific simulators used for process/device designing of semiconductor devices, such as process simulator, device simulator, capacitance simulator between conductors, and so on. Therefore, the only concentration has been on material developments for wiring, developing interconnect materials, more multi-level interconnect layered structures, and so-forth. FIG. 4 shows this situation, as described above. Moreover, generally, SPICE simulator and most of the device simulators extract the parasitic capacitance component in an equivalent circuit method. So, results have been reported such as $C_{GD}/C_{GS}$ calculation with only considering shape and parasitic capacitance at a cross over point of interconnect with simple definition, etc. as shown in FIG. 17. The definition is the substrate is flat and Vsub=0. In order to predict dynamical interaction between the multi-layered interconnections and MOSFETs with considering current flow/electric potential in conductors, a new numerical treatment based on electromagnetism is indispensable. It is desirable that such a new treatment solve the three-dimensional problem.

For 0.07 microns device or more scaled down, R&D situation has been completely and suddenly changed. More attention is paid to total structure of the device itself, electromagnetic equation itself without simplification. It is desirable to overcome existing difficulties of CAD estimation, by estimating signal delay and wire length distribution. FIG. 18 shows a conventional procedure for LSI development.

The problems facing the development of GSI are that because the simulations use a simple equivalent circuit method, it is difficult to precisely estimate delay time, performance, and the like. Because there is a lack of synthesis analysis across the entire lumped element devices, such criteria apply only to the interconnect process. In GSI, each specific space such as between via hole and gate electrode, between neighboring gate electrodes, between gate electrode and active area of neighboring device, and the like, become closer and closer. Therefore, neighboring devices and conductors mutually affect each other. By not incorporating cross talking in the scaled device, the full development of scaled device design is still impeded.

Herein, an overview of the current situation of CAD phase is made with special attention to accuracy of the phase. As we have seen about SUPREM4, SPICE, and some other relevant aspects in FIGS. 5 and 6, 8, and 10, respectively. Some improvements are made to the existing inaccurate situation of SPICE compared to experimental results; such as A. Witzig, C. Schuster, P. Regli, W. Fichtner, "Global modeling of microwave applications by combining the FDTD method and a general semiconductors device and circuit simulator", *IEEE Transaction on Microwave theory and techniques*, vol-47, no.6, (1999) 919. However, basically, such improvements do not make direct coupling or self-consistency between charge transport due to Poisson equation and some other electromagnetic phenomena, and fail to address the phenomena observed in scaled devices, such as electromagnetic related cross-talk.

Presently, there has not yet been established a method in practice which solves electromagnetic dynamics interaction across wiring, transistors, capacitance, resistors, and so-on during system operations, that are problematic for the conventional equivalent circuit model.

FIG. 19 shows an overview of a conventional LSI fabrication/design CAD phase. Conventional CAD technology may be categorized as shown in the upper half of the figure.

A conventional process simulation is mainly still two-dimensional, and a conventional device simulation is two- or three-dimensional. So, for some complicated structured devices such as shown in the lower half of FIG. 19, it is very difficult to estimate lumped device characteristics. Patchwork of simulations in individual sections is performed. Conventional CAD technology can be categorized in terms of its basic equation as shown in the upper half of FIG. 20.

As shown, the conventional process simulation is mainly still in two-dimensional, and the device simulation is in two- or three-dimensions shown in FIG. 20.

In summary, although interest in peripheral inductive effects, cross talking between interconnect and devices and so-on have grown with recent growing demand for scaled system LSI and scaled Si-based RF communication circuits, incorporation of the physical phenomena of interconnects and devices into design tool development has been limited.

SUMMARY OF THE INVENTION

It is an object of the present inventions to provide (1) a predictable novel simulation system and a simulation method which can simulate a circuit dynamic characteristics for a three-dimensional lumped electron device circuit including transistors, interconnects, capacitors, resistor regions, and more particularly which can simulate dynamic characteristics based on Maxwell's equation coupled with Poisson's equation applying to an entire region for the said three-dimensional lumped electron device circuit including transistors, interconnects, capacitors, resistor regions, and (2) a semiconductor fabrication method using a predictable novel simulation system which can simulate a circuit dynamic characteristics for a three-dimensional lumped electron device circuit including transistors, interconnects, capacitors, diffusion region, and more particularly which can simulate dynamic characteristics based on Maxwell's equation coupled with Poisson's equation applying to an entire region for the said three-dimensional lumped electron device circuit including transistors, interconnects, capacitors, resistor regions.

The present invention provides an electronic circuit design simulator comprising a three-dimensional lump device element part, a three-dimensional visco-elastic process simulation part interlinked with a three-dimensional lump device element part, and a material design part interlinked with the three dimensional lumped device element part and a three-dimensional visco-elastic process simulation part. The three-dimensional visco-elastic process simulation part may comprise a visco-elastic model for device material, a non-equilibrium point defect diffusion model, and an anisotropic young modulus model. The three-dimensional visco-elastic process simulation part may also comprise elements for simulating a metal deposition process, a metal etching process, a silicon substrate oxidation process, a poly silicon film oxidation process, an ion implantation process, and an impurity diffusion process.

The three-dimensional lumped device element part may comprise any of a Poisson's equation model, an electron continuity equation model, a hole continuity equation model, a Maxwell's equations model, an eddy current equation model, and an Ohm's law equation model.

The present invention may also provide an electronic circuit simulator comprising a mask pattern process sequence model, a material simulator, a three-dimensional process simulator coupled to the mask pattern sequence model in the material simulator, and an equation model coupled to the three-dimensional process simulator executing circuit model equations in response to the three-dimensional process simulator.

The present invention provides a simulation model that accounts for peripheral inductive effects and cross talking between interconnect and devices for scaled system LSI and scaled Si-based RF communication circuits.

DESCRIPTION OF THE DRAWINGS

FIG. 6($b$) shows a three-dimensional graph of subthreshold current in the simulated MOSFET.

FIG. 12a is a graph showing the circuit wave forms for the switching characteristics of a CMOS inverter; and FIG. 12b is graph showing the trajectory of n-transistor operating point during switching of the CMOS inverter of FIG. 12a.

FIG. 13 shows the conventional approximation of intrinsic MOS gate capacitance conversion.

FIG. 16 shows a cross-sectional schematic structural view of a pillar-shaped vertical transistor with surrounding gate.

FIG. 17 shows a conventional peripheral capacitance estimation procedure and modeling in a TCAD tool.

FIG. 18 shows conventional procedure for LSI development.

FIG. 19 shows an overview of a conventional LSI fabrication/design CAD phase.

FIG. 24 shows a schematic illustration of E and H discretization algorithm according to one embodiment of the present invention.

FIG. 25 shows simulated results of point-defect concentration for two different source structures using the simulation model according to one embodiment of the present invention.

FIG. 28 shows an illustration of the simulation results of the materials part of the three-dimensional simulation system according to one embodiment of the present invention.

FIG. 40 shows a series of equations for the simulator according to one embodiment of the present invention.

DETAILED DESCRIPTION OF THE EMBODIMENTS

Figures 1, 2:
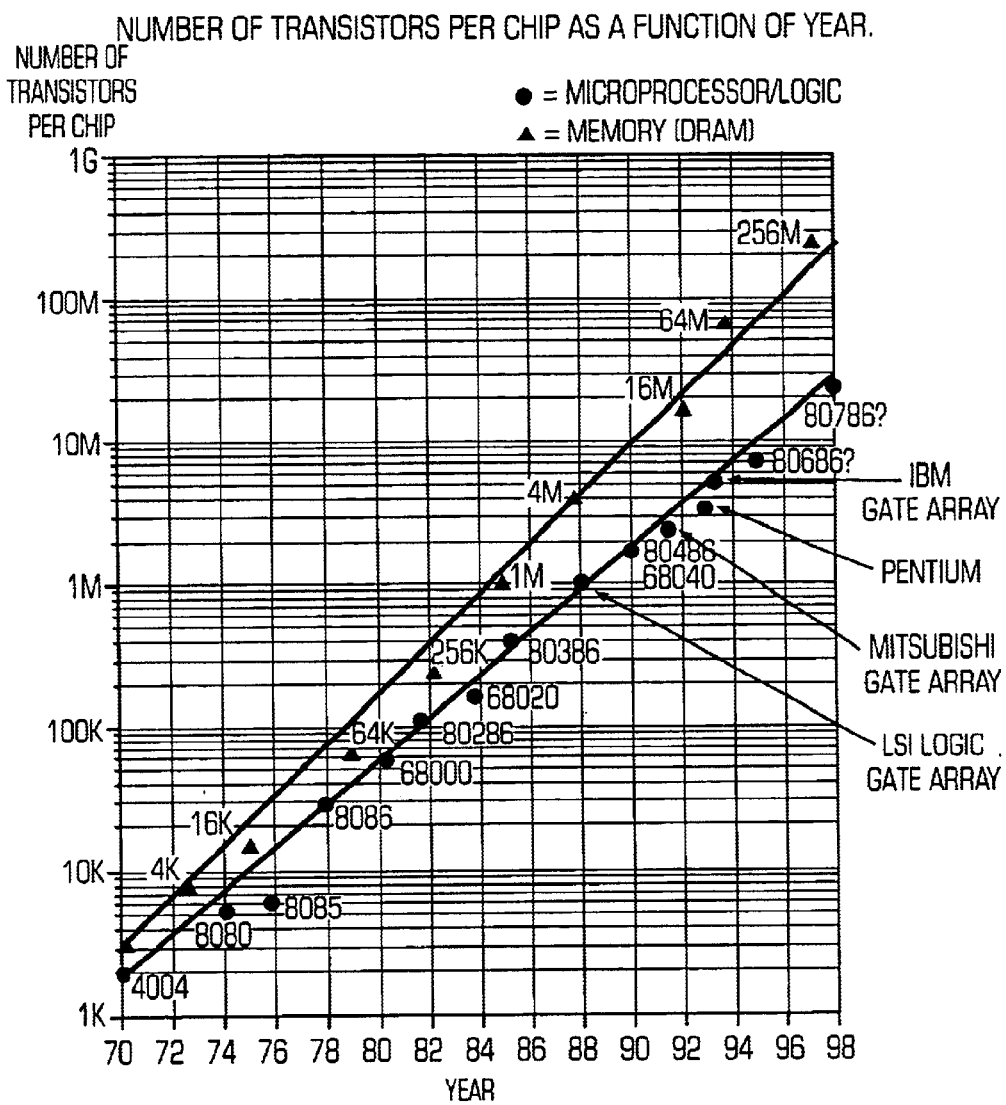
FIG. 1 is a graph showing the number of transistors per microprocessor and memory chips (on a logarithmic scale) as a function of year.
FIG. 2 shows the typical technology parameters as a function of LSI generation.
Figure 3:
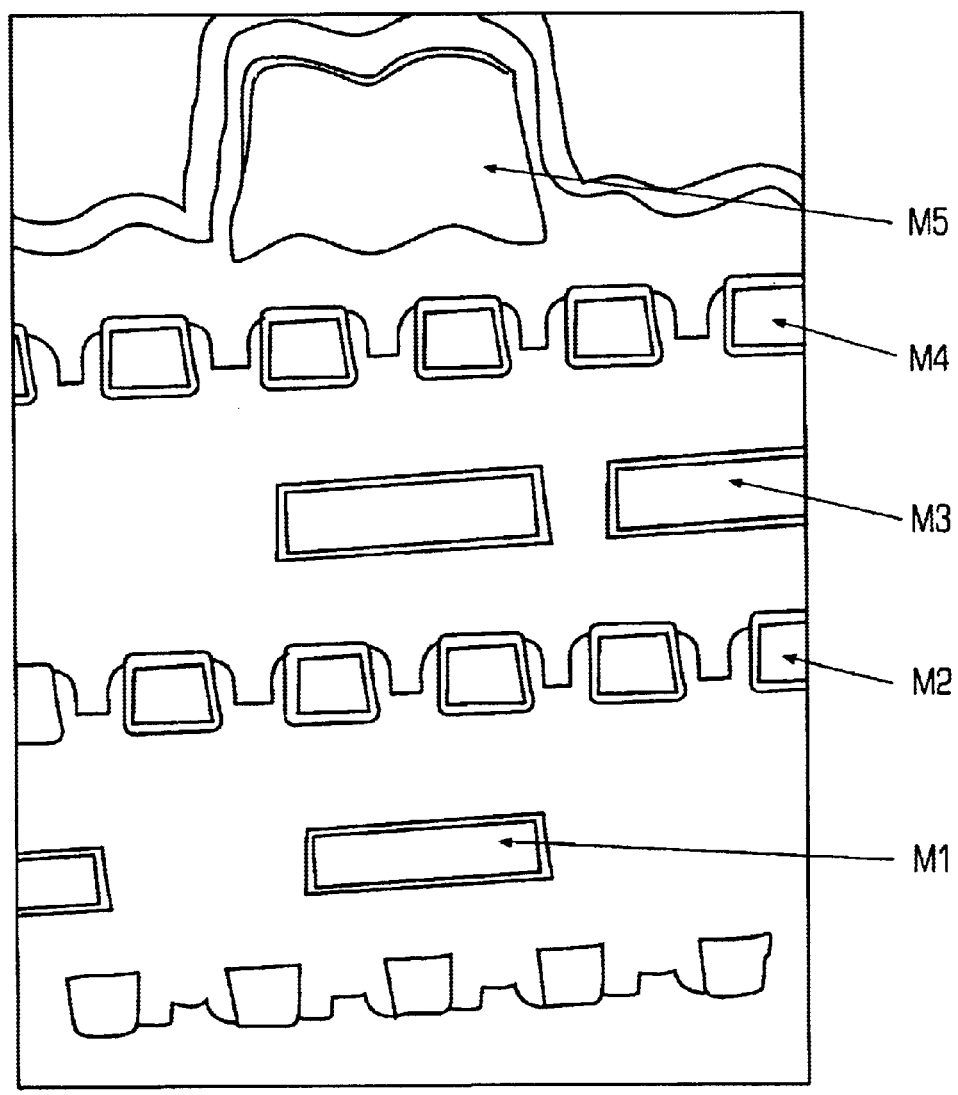
FIG. 3 shows a cross sectional image of recent conventional devices.
Figure 4:
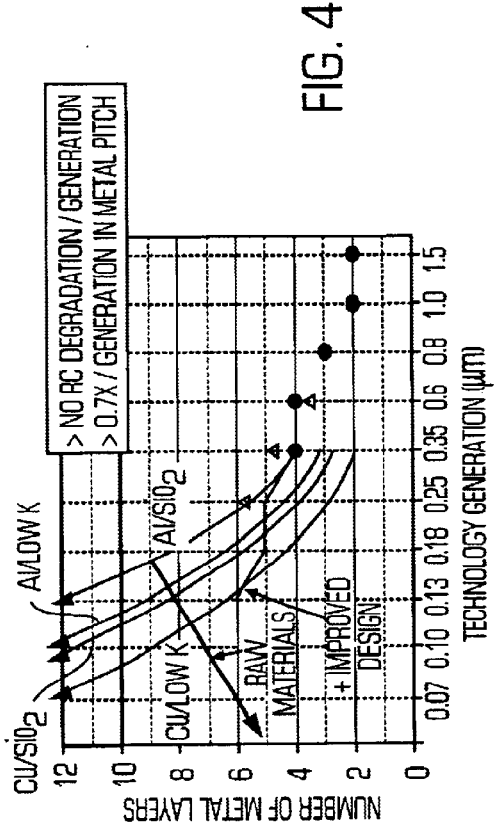
FIG. 4 is a graph showing the number of metal layers as a function of technology generation.
Figure 5:
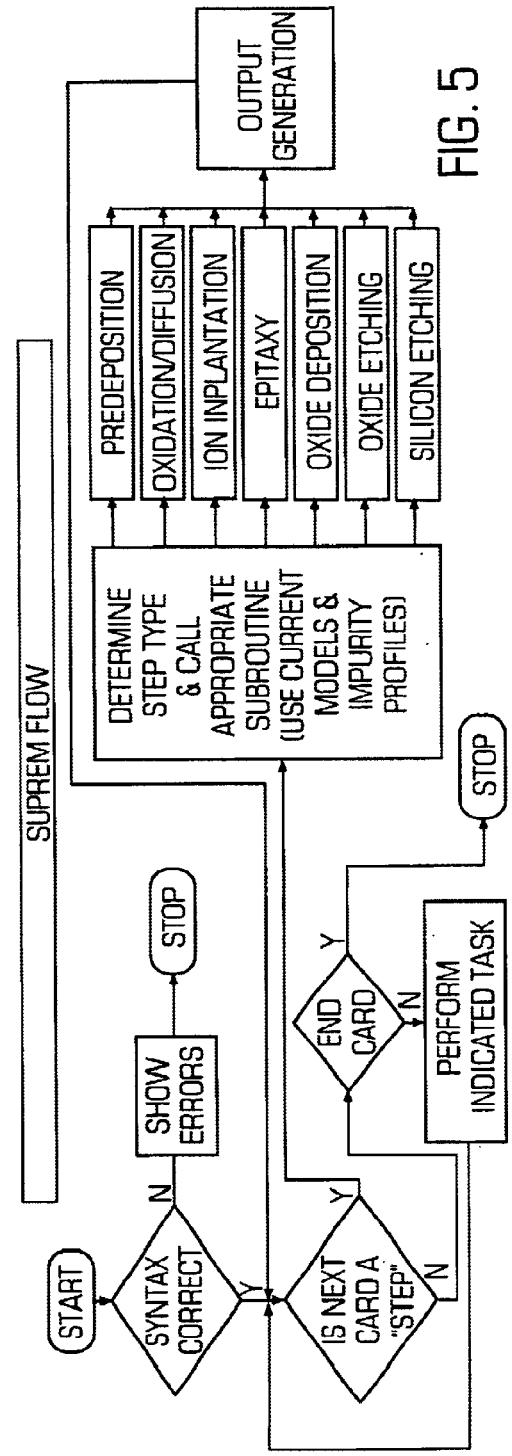
FIG. 5 shows an overview of the process flow of the conventional simulator SUPREM.
Figure 6A:
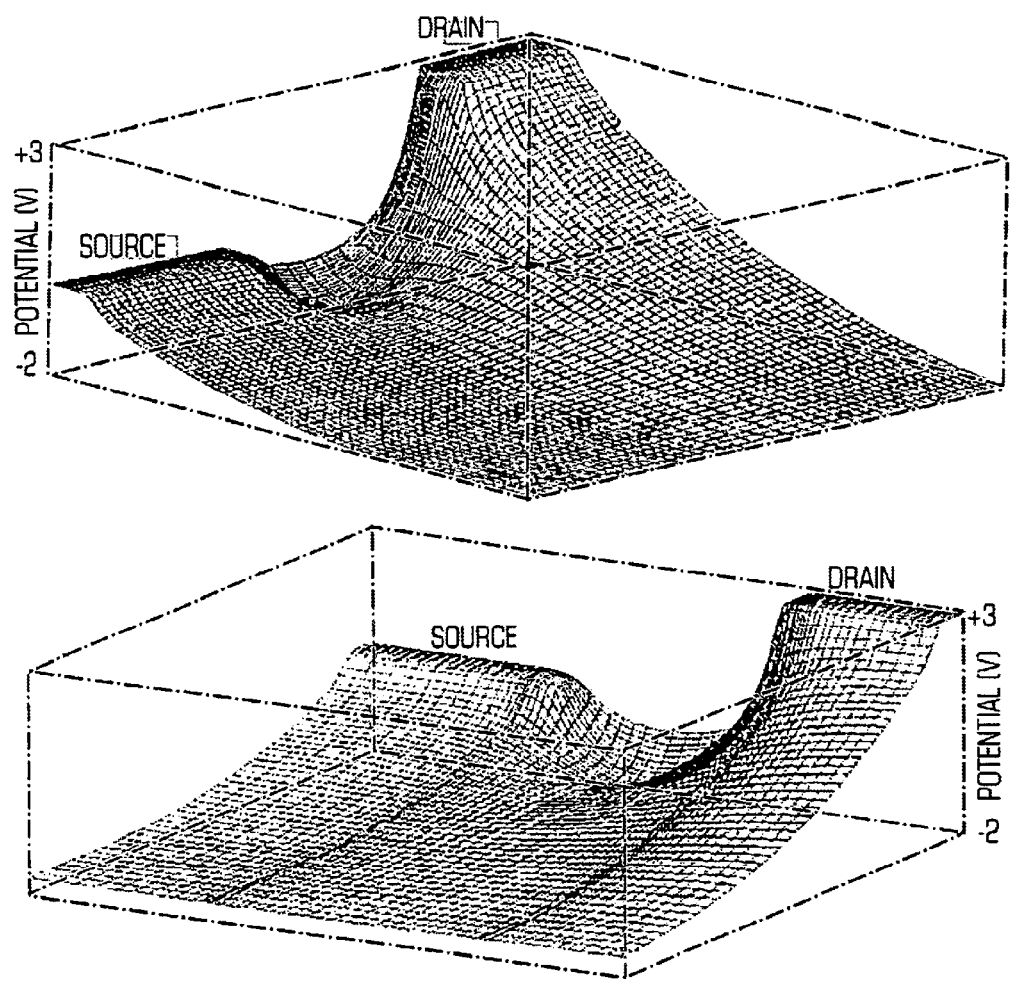
FIG. 6($a$) shows a three-dimensional graph of the potential plotted from a conventional device simulation solution based on estimated impurity profiles.
Figure 6B:
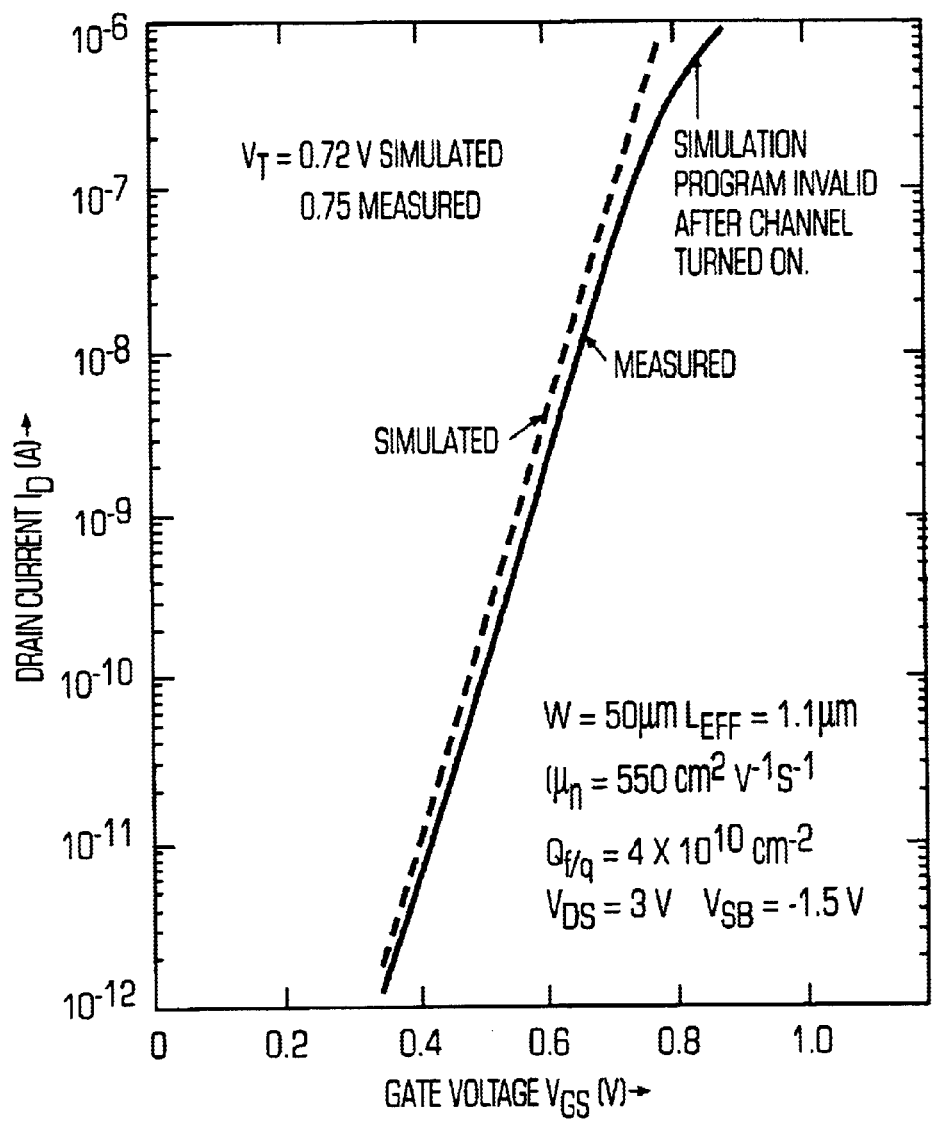
Figures 7, 8:
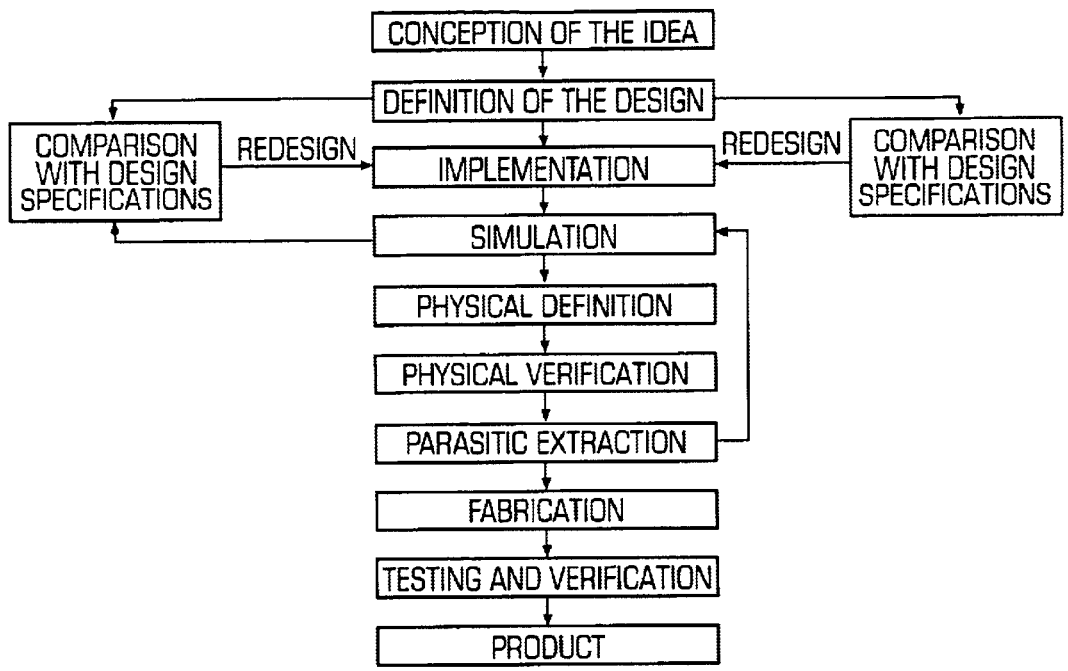
FIG. 7 is a flow chart showing a typical conventional design process phase for an analog integrated circuit for telecommunications.
FIG. 8 shows a typical MOSFET call in a conventional SPICE simulator.
Figure 9:
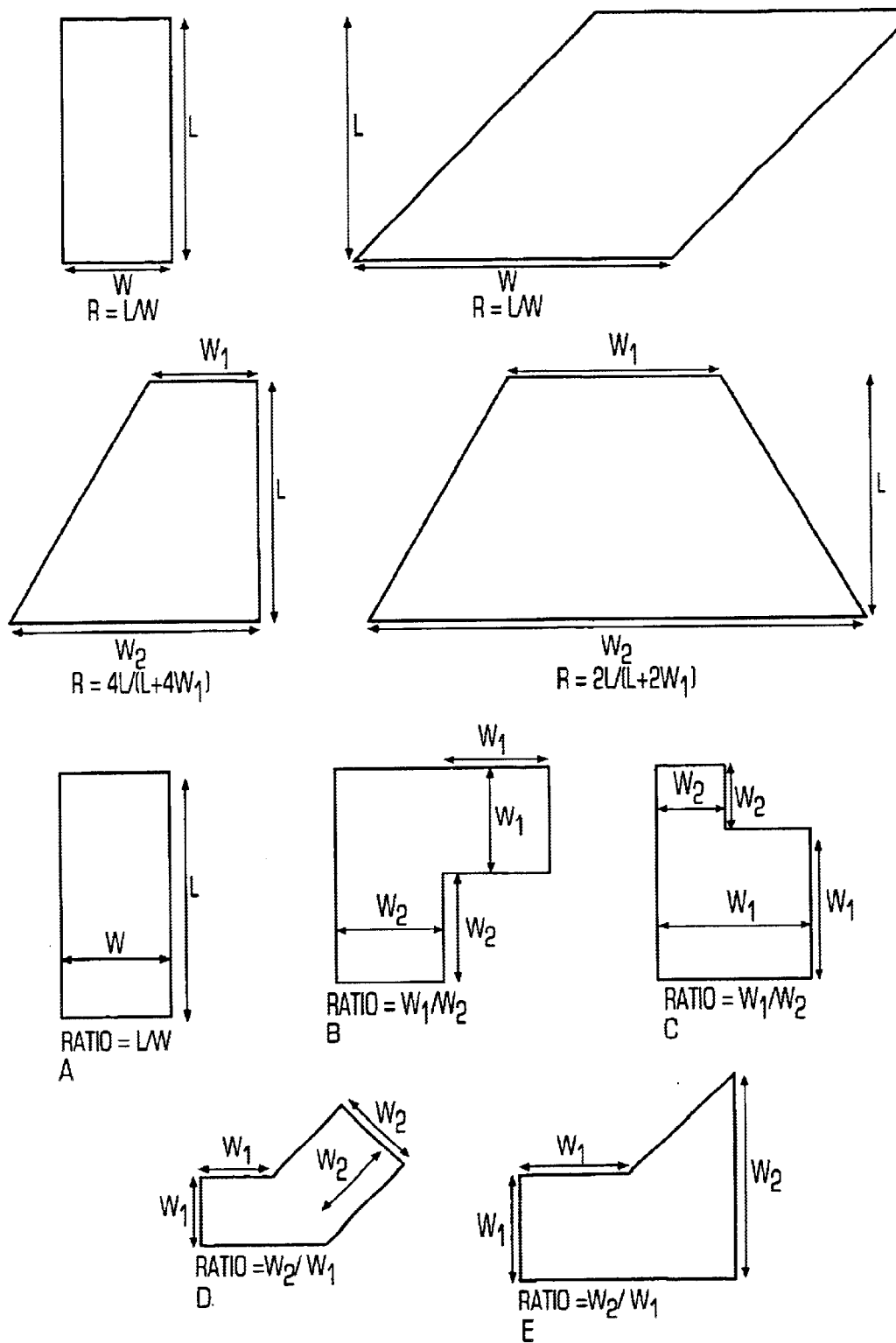
FIG. 9 shows a method of calculating the resistance by breaking the shape in question into simple regions.
Figure 10:
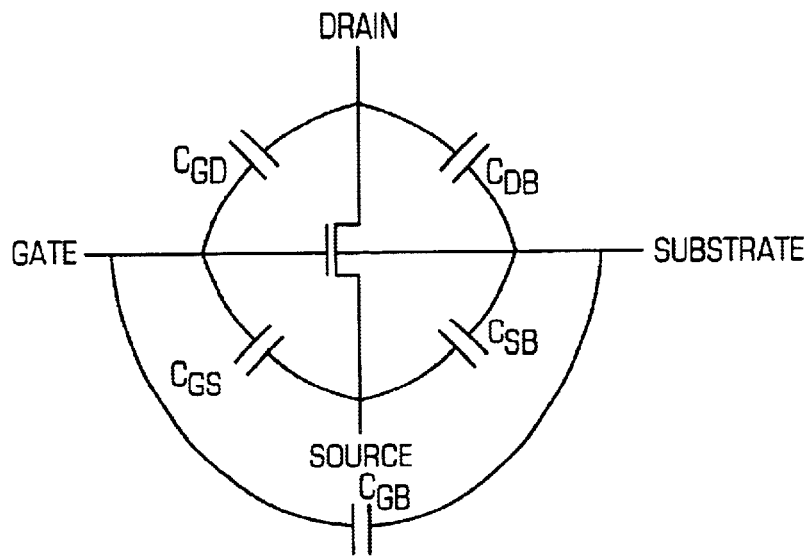
FIG. 10 show the typical circuit symbols for parasitic capacitance in conventional SPICE modeling.
Figure 11:
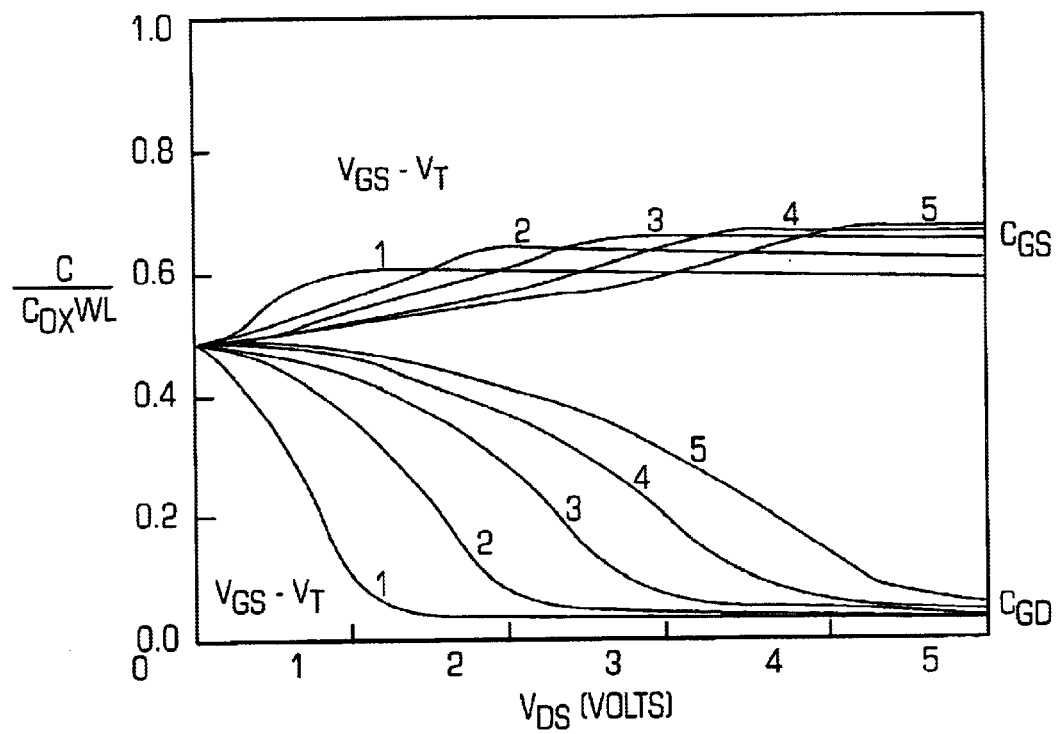
FIG. 11 is a graph showing typical total gate capacitance of a MOS transistor as a function of Vgs.
Figure 14:
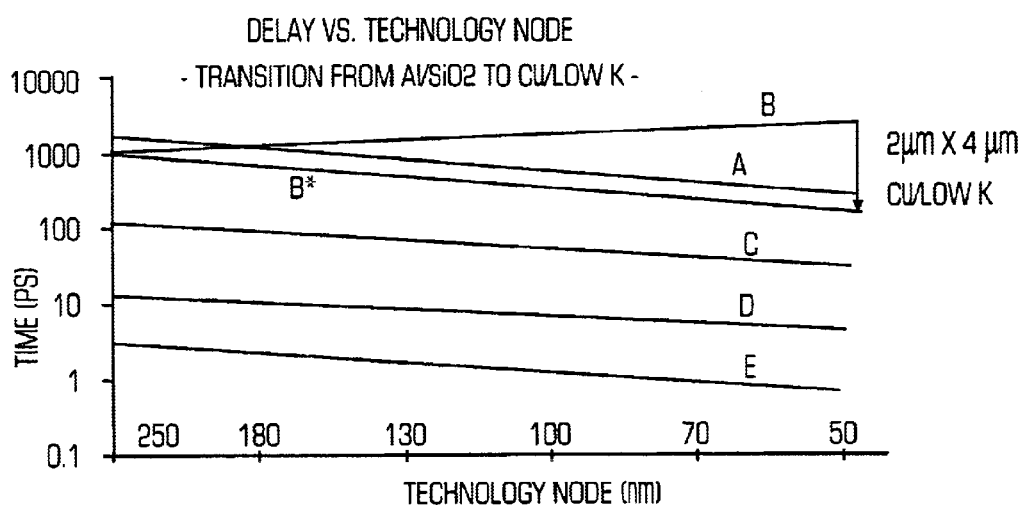
FIG. 14 is a graph showing typical delay times for various technology nodes.
Figure 15A:
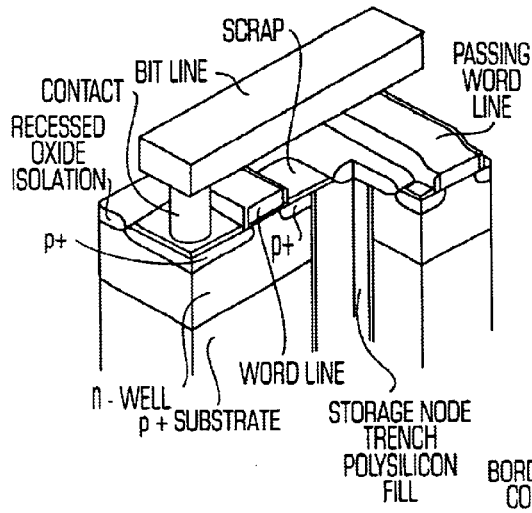
FIGS. 15(a) though (d) show recent conventional DRAM cell structures.
Figure 15C:
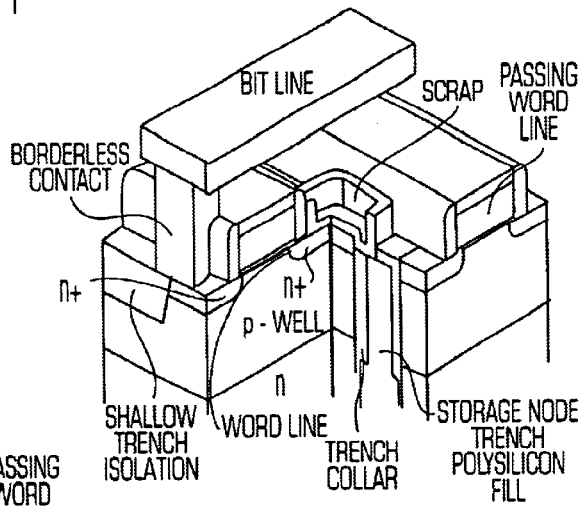
Figure 15B:
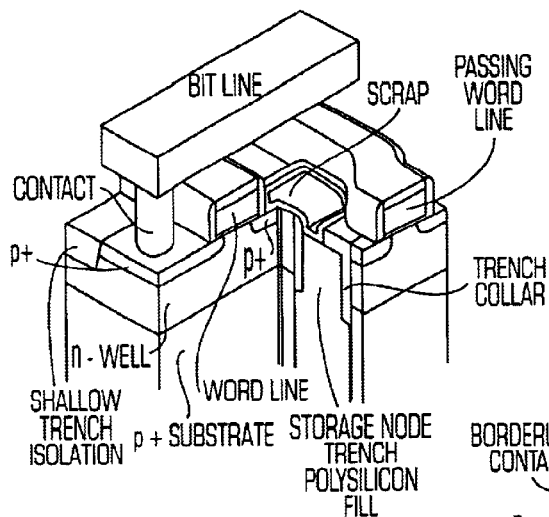
Figure 15D:
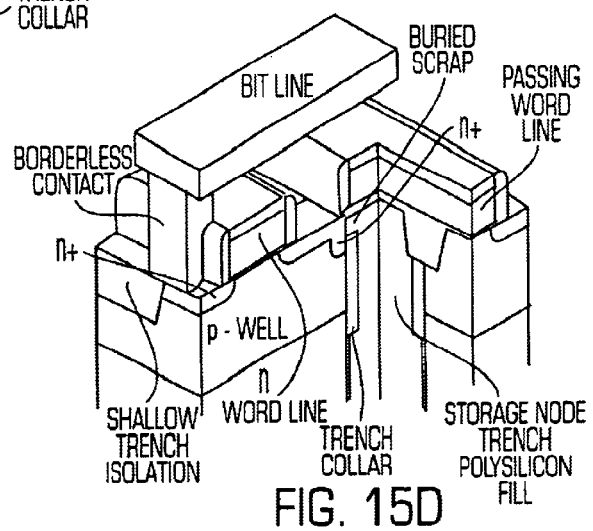
Figures 20, 21:
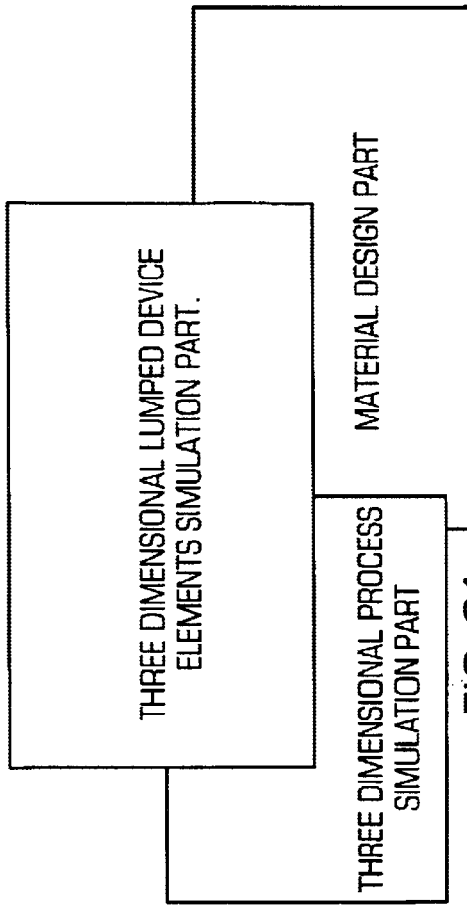
FIG. 20 shows an overview of current LSI fabrication/design CAD phase.
FIG. 21 is a conceptual system overview of a simulator according to one embodiment of the present invention.

FIG. 21 shows a conceptual system overview of a simulator according to one embodiment of the present invention. The simulator system according to the present invention comprises a three-dimensional lumped device element simulation part, a three-dimensional visco-elastic process simulation part, and a material design part.

The three-dimensional lumped device element simulation part is interlinked with both the three-dimensional process simulation part and the material design part as shown in FIG. 21. The three dimensional process simulation part also is interlinked with the material design part.

The three-dimensional visco-elastic process simulation part comprises a visco-elastic model for silicon silicide, and $SiO_2$, a non-equilibrium point-defect diffusion model, and an anisotropic Young modulus model. The three-dimensional visco-elastic process simulator can execute a metal deposition process, a metal etching process, a silicon substrate oxidation, a poly-silicon film oxidation, an ion implantation, a diffusion of impurities, and so on. The individual models in the process simulation part may be, for example, conventional models. However, the present invention combines anisotropic models of silicon in the process simulation part (Young modulus, oxidation rate, and the like.) with the anisotropic models in lumped device element part (carrier mobility, charge population, intrinsic carrier concentration and the like). The three-dimensional process simulation can predict anisotropic residual stress in the substrate.

Figure 22:
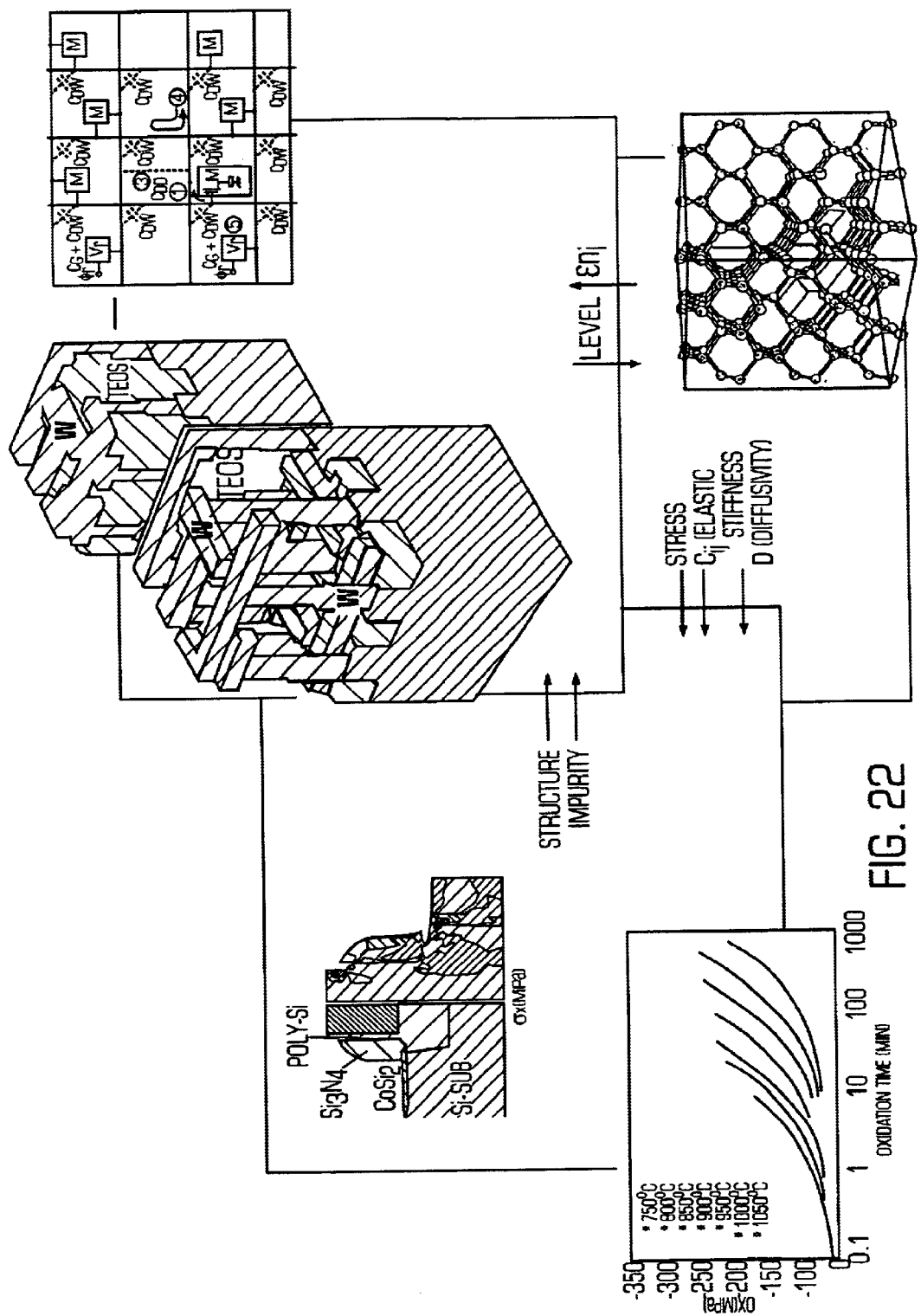
FIG. 22 shows an illustration of a simulator system according to one embodiment of the present invention.

An overview of the usages of a simulator system according to the present invention is illustrated in FIG. 22. The left side in FIG. 22 shows typical output results obtained from the three-dimensional visco-elastic process simulation part. In the process simulation part, by considering anisotropy effects, such as Young modulus of substrate, oxidation rate, ion implantation profiles and the like, more precise stress distribution, device structure and impurity profiles can be predicted. FIG. 22 shows a simulated stress distribution in a typical MOS device, including intensive tensile regions, and compressive regions. This stress distribution affects device characteristics. The three-dimensional visco-elastic process simulation part provides process simulation data, such as structure and impurity data, to the three-dimensional lumped device part in the upper right side in FIG. 22. In this part, more precise lumped device characteristics can be predicted by considering anisotropic silicon band modulation. Since the final stress distribution after the interconnection process can be predicted more accurately, lumped device characteristics can be predicted by considering stress effects. The three-dimensional lumped device part provides field level information to the material design part simulator and receives from the material design part simulator the dielectric constant $\epsilon$ and intrinsic carrier concentration $n_i$ information. The lower right figure shows an example of the material design part simulator. In this part, material characteristics and physical parameters, such as elastic stiffness $C_{ij}$ can be predicted. The material design simulator provides stress information, elastic stiffness $C_{ij}$, and impurity diffusivity $D_{ij}$ information to the three-dimensional visco-elastic process simulation part.

Figure 23:
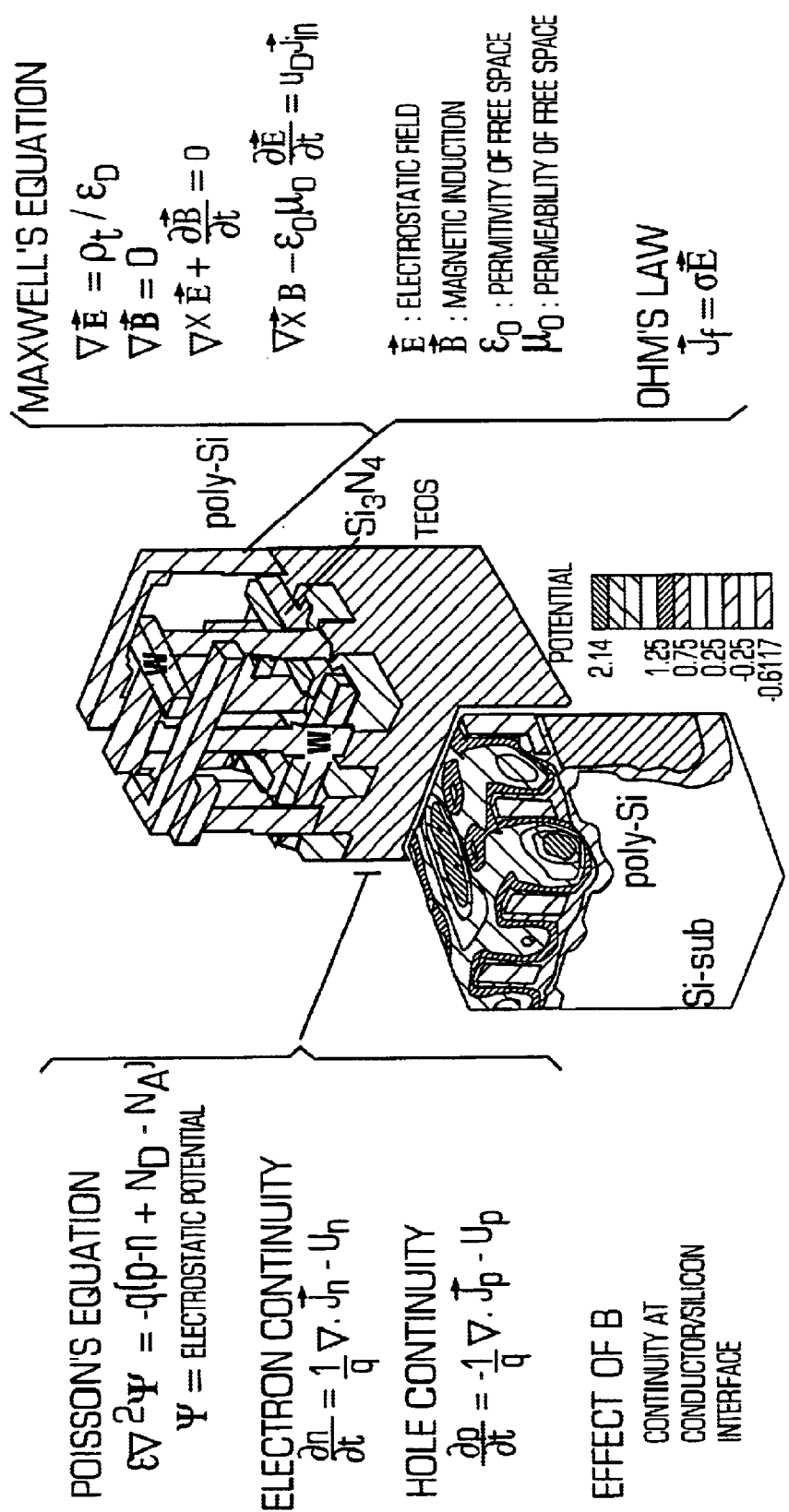
FIG. 23 shows a schematic illustration of models and algorithm according to one embodiment of the present invention.

FIG. 23 shows a schematic illustration of models and algorithm implemented in the three-dimensional lumped device element simulation part according to one embodiment of the present invention. The three-dimensional lumped device element simulation part includes Poisson's equation model, an electron continuity equation model, a hole continuity equation model, a Maxwell's equation model, an eddy current equation model, and an Ohm's law equation model.

One of the most important features of electromagnetics is that electromagnetic waves can travel through space, without the need for a guiding structure. These waves are called space waves, because they can propagate through empty space, which we say free space. Space waves can also propagate in nearly any kinds of medium. FIG. 24 show a schematic illustration of a discretization algorithm for calculation of electric field E and magnetic field H.

The simplest kind of space waves that can be produced by a source are called plane waves, so named because their constant-amplitude and constant-phase surfaces are flat sheets. Not only are these waves the simplest space waves, they are also excellent approximations of the waves most commonly encountered in engineering practice. This is because nearly all space waves behave like plane waves after they propagate. In simple, source-free media, Maxwell's equations become $\nabla \times E = -j\omega\mu H$ $\nabla \times H = (\sigma + j\omega\epsilon)E$ $\nabla E = 0$ $\nabla H = 0$ Any field distribution that can exist in a simple, source-free medium satisfies these equations. According to one embodiment of the present invention, there is a direct-coupled equation between Poisson's equation and Maxwell's equations through a term of charge density part.

FIG. 24 shows a schematic illustration of E and H discretization algorithm implemented in present invention. FIG. 25 shows simulated results of point-defect concentration for two different source structures using the simulation model according to one embodiment of the present invention.

Figure 26:
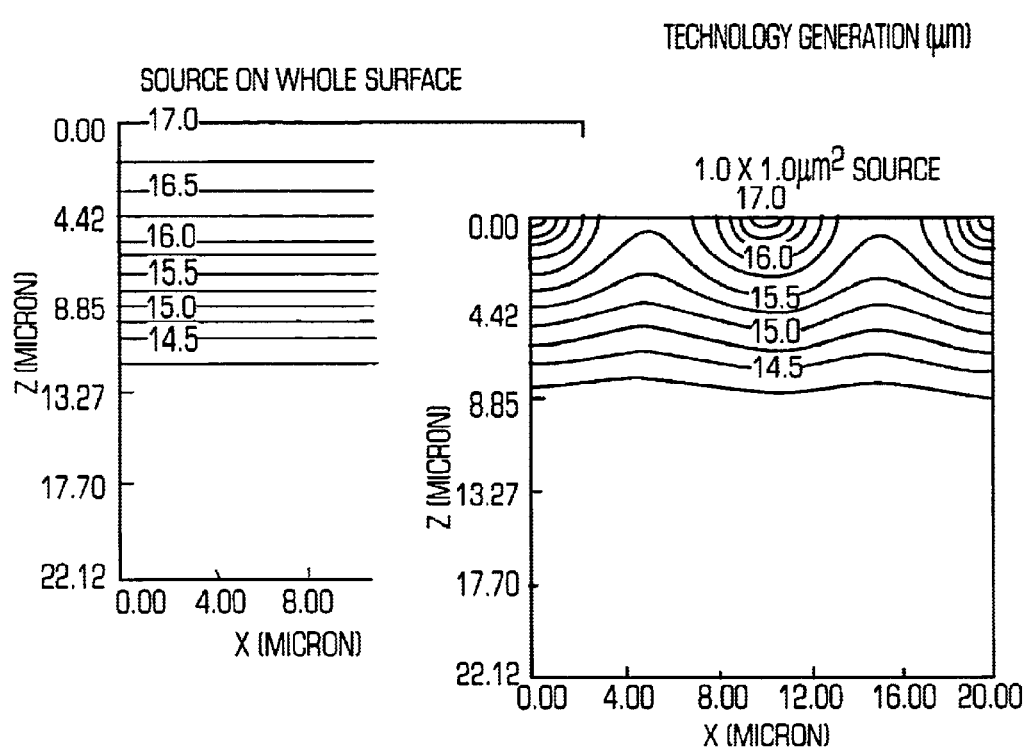
FIG. 26 shows specially organized calibration of three-dimensional process simulator for the results of FIG. 25.

FIG. 26 shows specially organized calibration of three-dimensional process simulator for the results of FIG. 25. In the visco-elastic process part, dopant diffusion may be more accurately predicted. In the simulation, not only dopant diffusion but also the vacancy/interstitial diffusion in silicon is considered. In the present invention, in order to measure these point defects diffusitivities, a special experiment has been performed. The upper figure in FIG. 25 shows a schematic illustration of the special experiment. The lower figure shows a mask pattern used in the experiment. FIG. 26 shows a 3D typical point defect distribution profile predicted by using the optimized point defect diffusivity.

Figure 27:
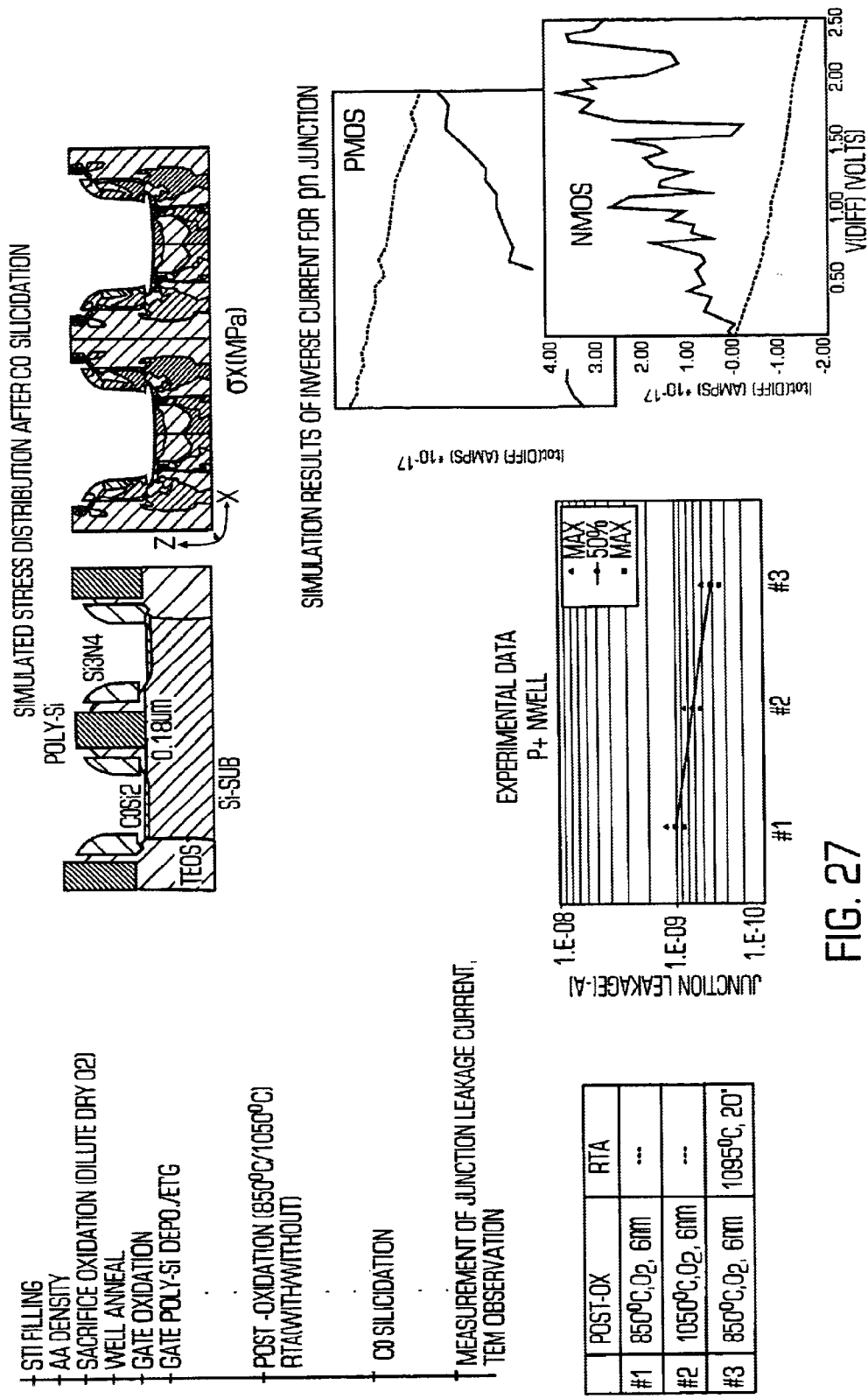
FIG. 27 shows illustrations of the results of the point defect concentration for two different source structures using the three-dimensional simulation system according to one embodiment of the present invention.

FIG. 27 shows illustrations of the results of the point detect concentration for two different structures using the three-dimensional simulation system, according to one embodiment of the present invention. When the stresses remain in the device active area, device characteristics are varied. FIG. 27 shows the comparison of simulation results with the measurement results.

Figure 29:
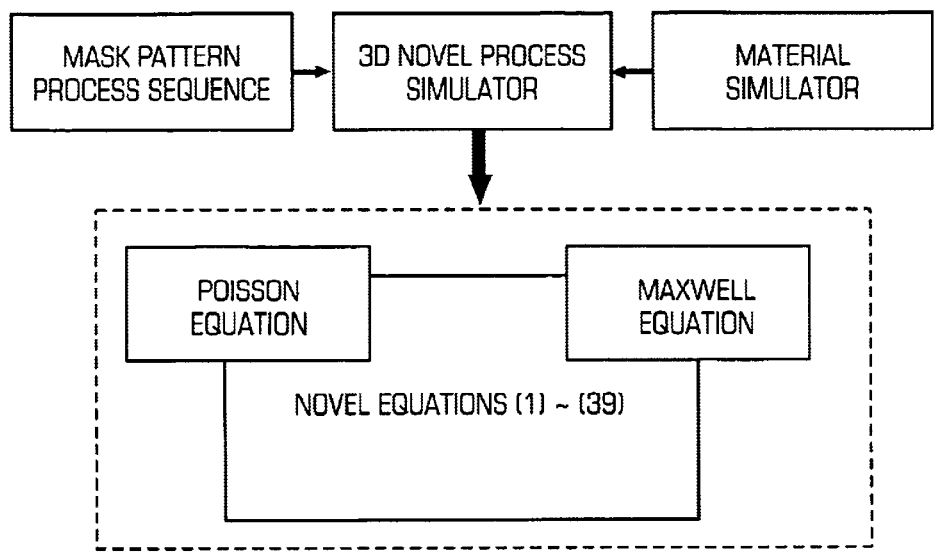
FIG. 29 shows a block diagram of a CAD according to one embodiment of the present invention.

FIG. 28 shows an illustration of the simulation results of the materials part of the three-dimensional simulation system according to one embodiment of the present invention. For calculation of elastic properties such as elastic stiffness and the like, the lattice behavior is examined. Therefore, a molecular level simulator is included in the simulation of the present invention. From the prediction and analyses of lattice behavior under stresses by using the molecular level simulator, elastic stiffness can be simulated. FIG. 29 is a block diagram of a CAD according to the present invention. The three-dimensional process simulator receives the mask pattern and the process sequence as input and also receives the physical mechanical parameters for each material as input from the material simulator. The process simulator provides its simulation results to the device simulator, which simulates the lumped device characteristics using equations (1)–(16), described below.

Figure 30:
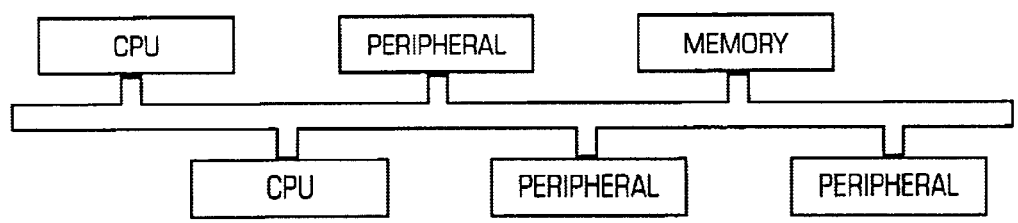
FIG. 30 shows a typical bus architecture used in the simulator CAD system according to one embodiment of the present invention.

For high performance computing, scalable parallel processing, a bus line scheme, a shared memory aspect and the like are examined. FIG. 30 shows a typical bus architecture used in the simulator CAD system according to one embodiment of the present invention.

In one illustrative example, the execution area has dimensions of 5.03 $\mu$m (horizontal)×9.34 $\mu$m (vertical)×15.0 $\mu$m (depth).

Embodiments of the present invention are explained with reference to the accompanying drawings. Referring to FIGS. 31 to 35, there is shown the fabrication, the layout, and the propagation delay time calculation and design for a comparator according to one embodiment of the present invention. For the fabrication of the scaled circuits, conventional processes are adopted except for structure modifications.

The process is explained by reference to schematic figures in FIGS. 31 and 32. The dimensions in the figures are not to scale for clarity.

Figure 31:
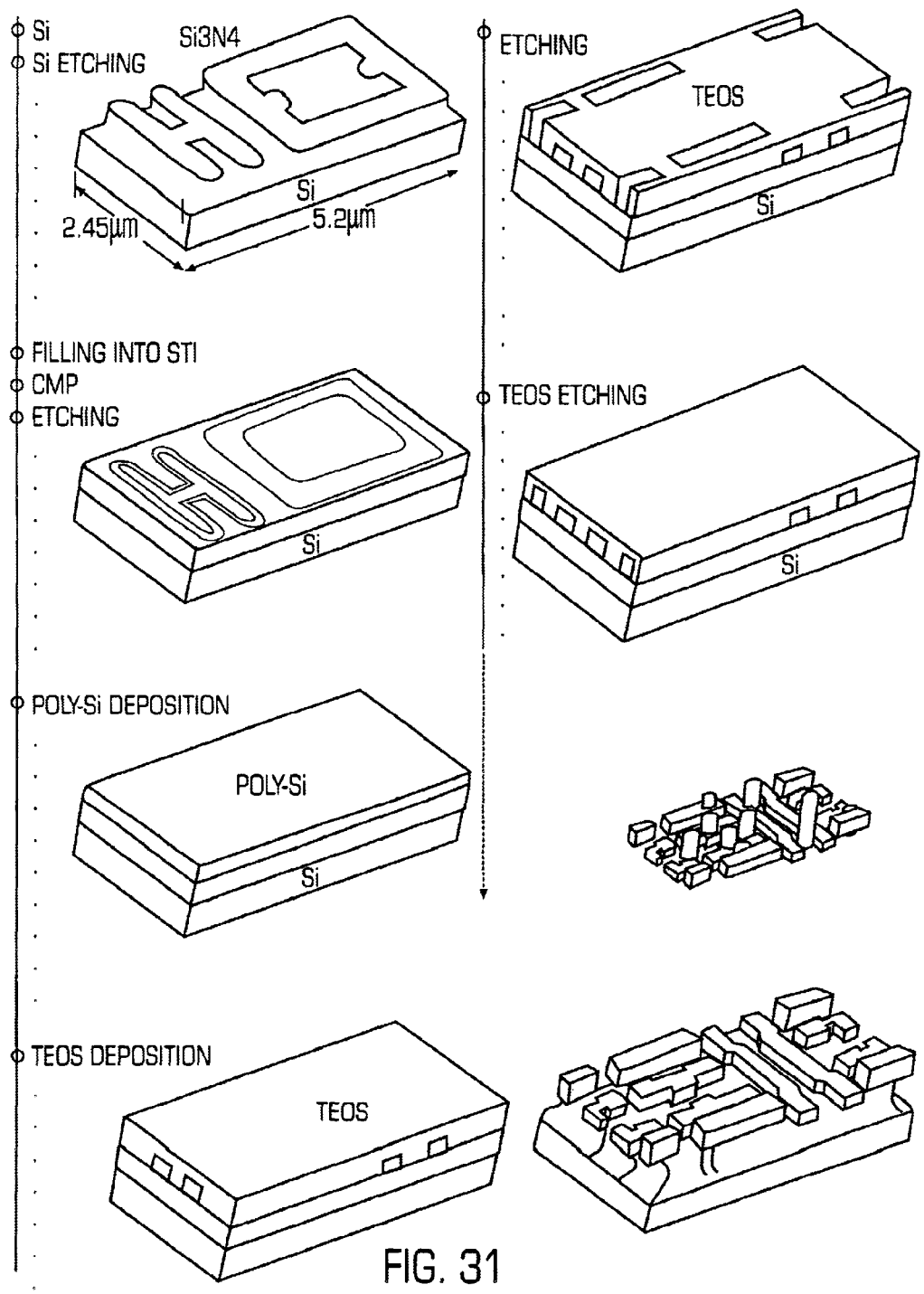
FIG. 31 shows a schematic perspective view of the output results of a three-dimensional process simulation for lumped element devices of a typical memory cell according to one embodiment of the present invention.
Figure 32A:
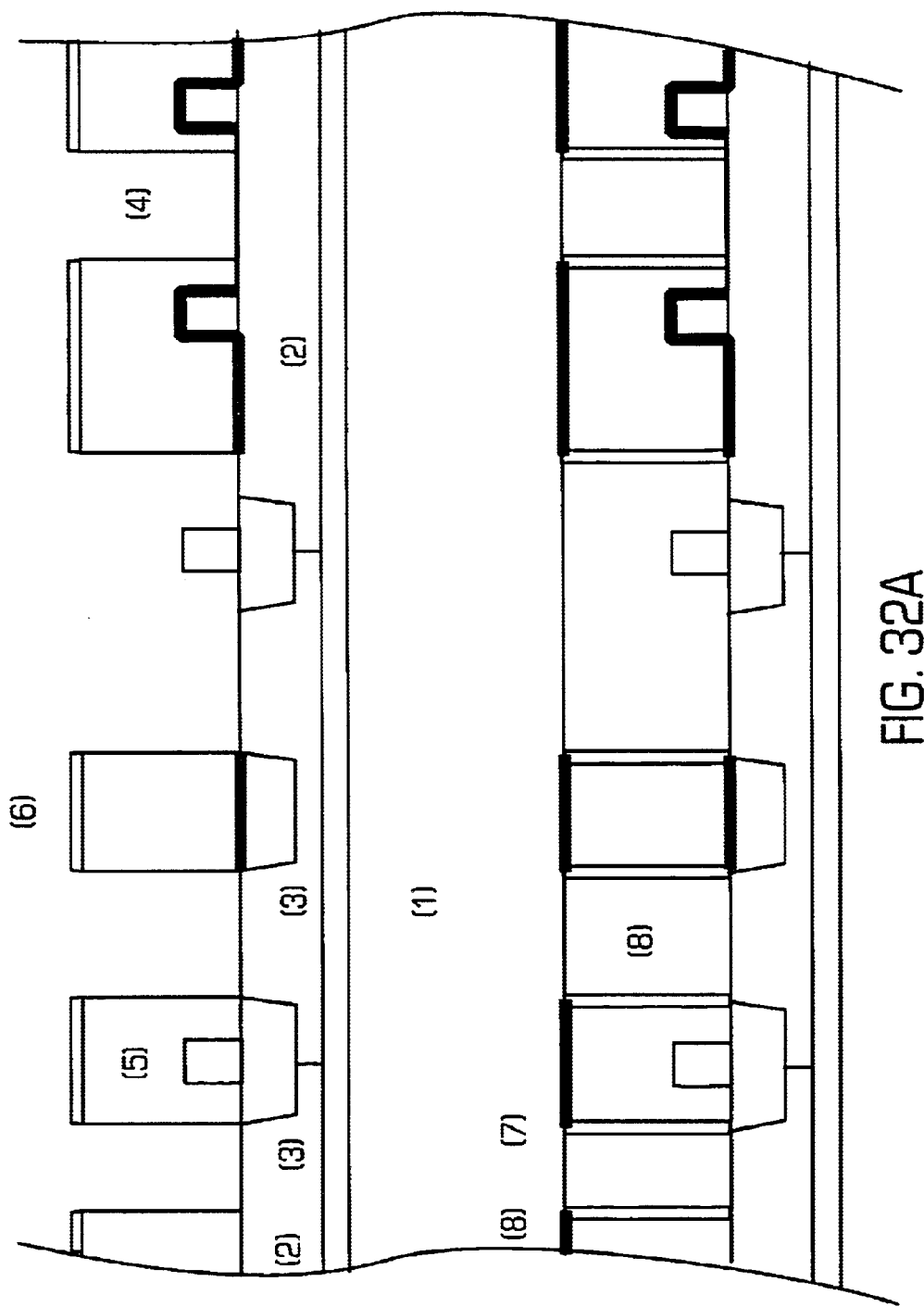
FIG. 32 shows schematic cross sectional view of a device made by the process flow of FIG. 31 according to one embodiment of the present invention.
Figure 32B:
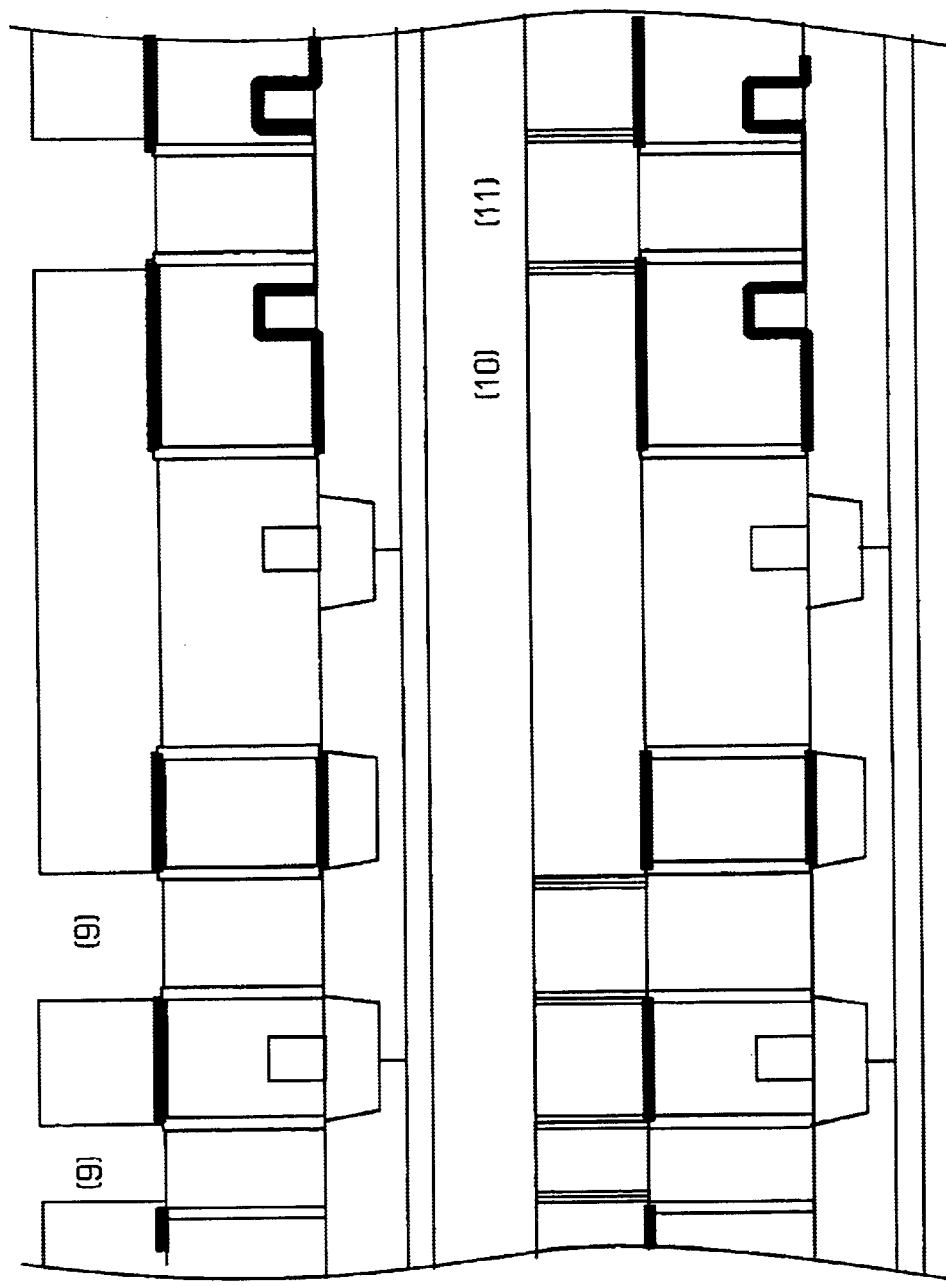
Figure 32C:
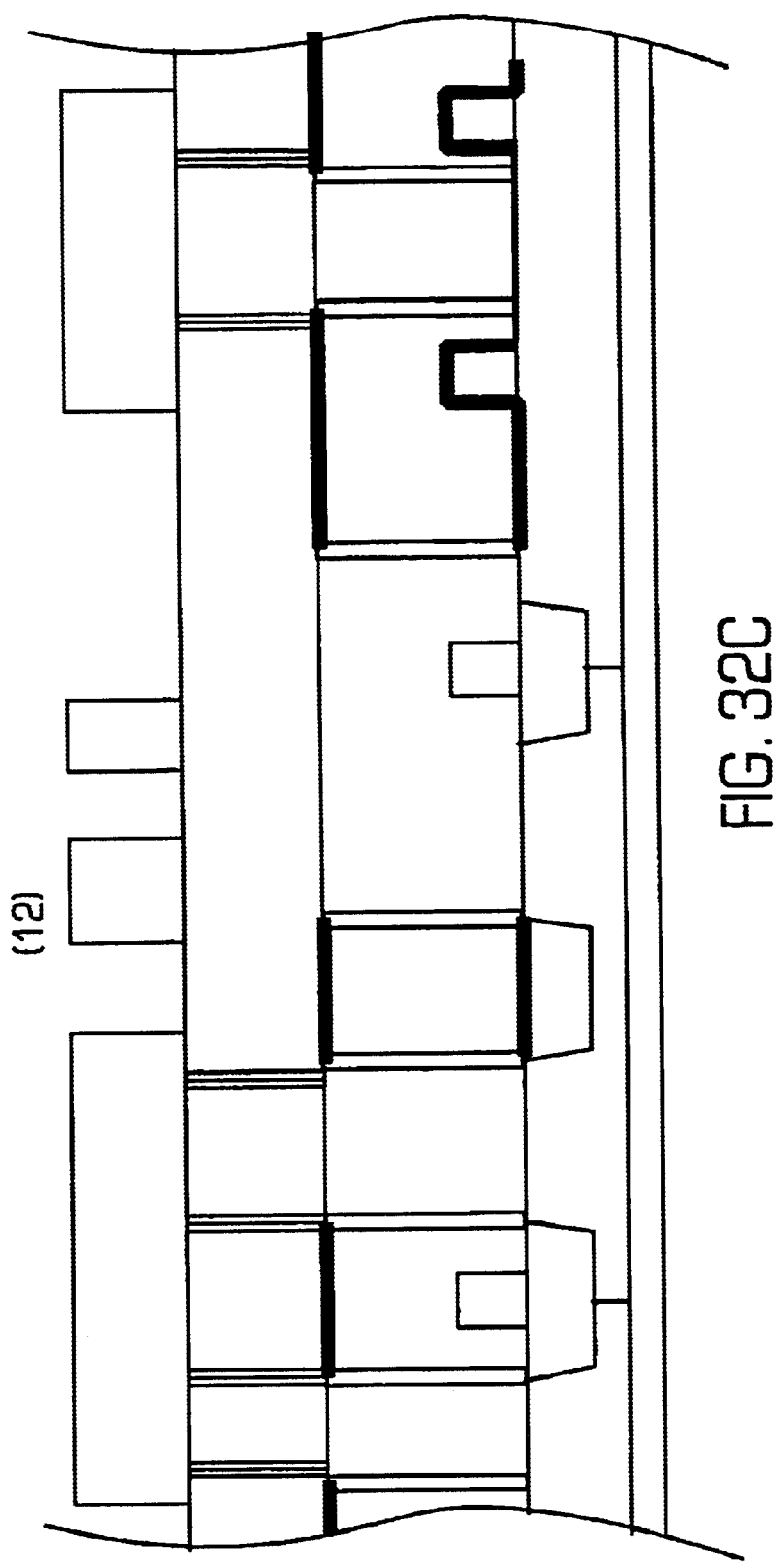
Figure 32D:
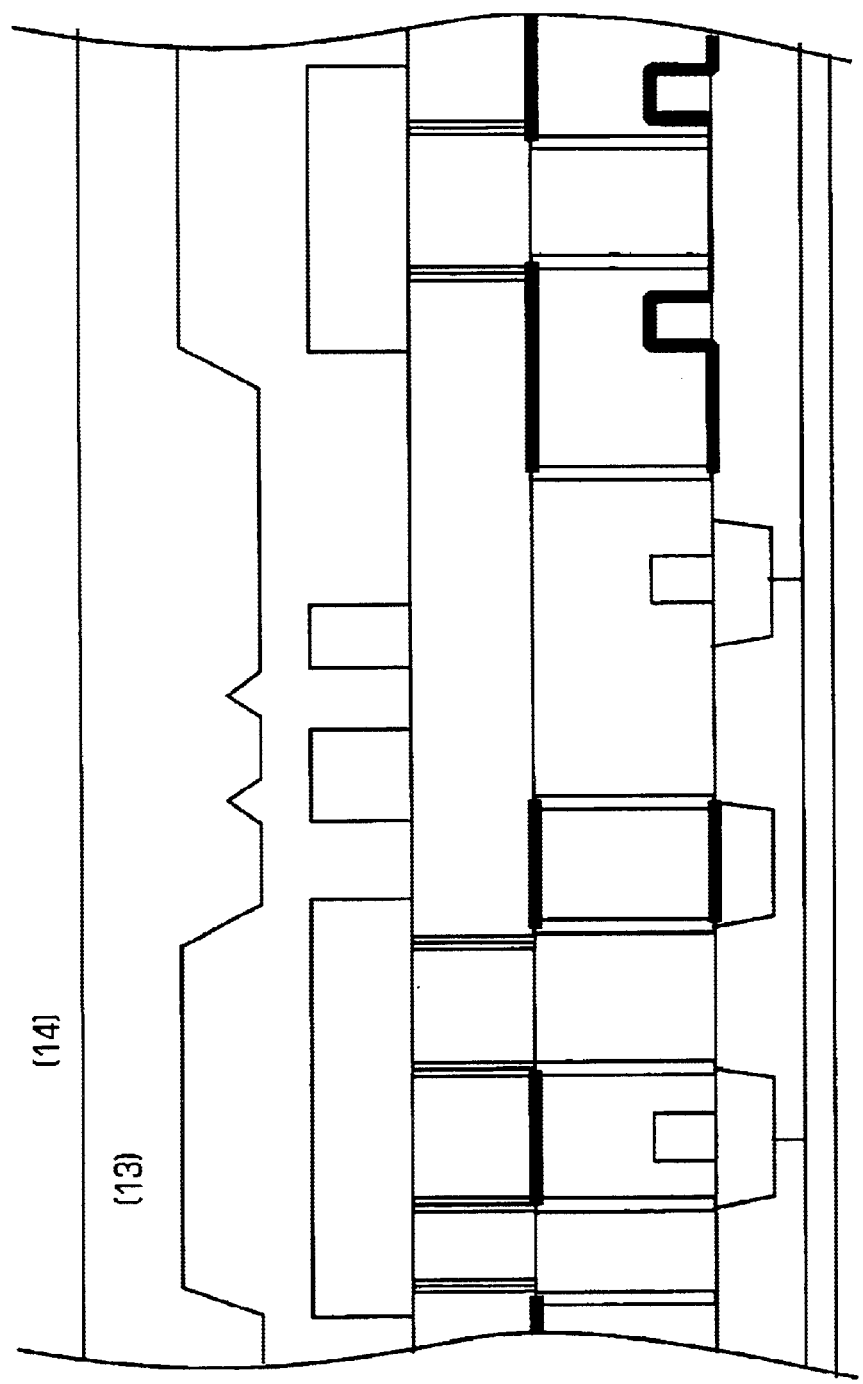
Figure 33:
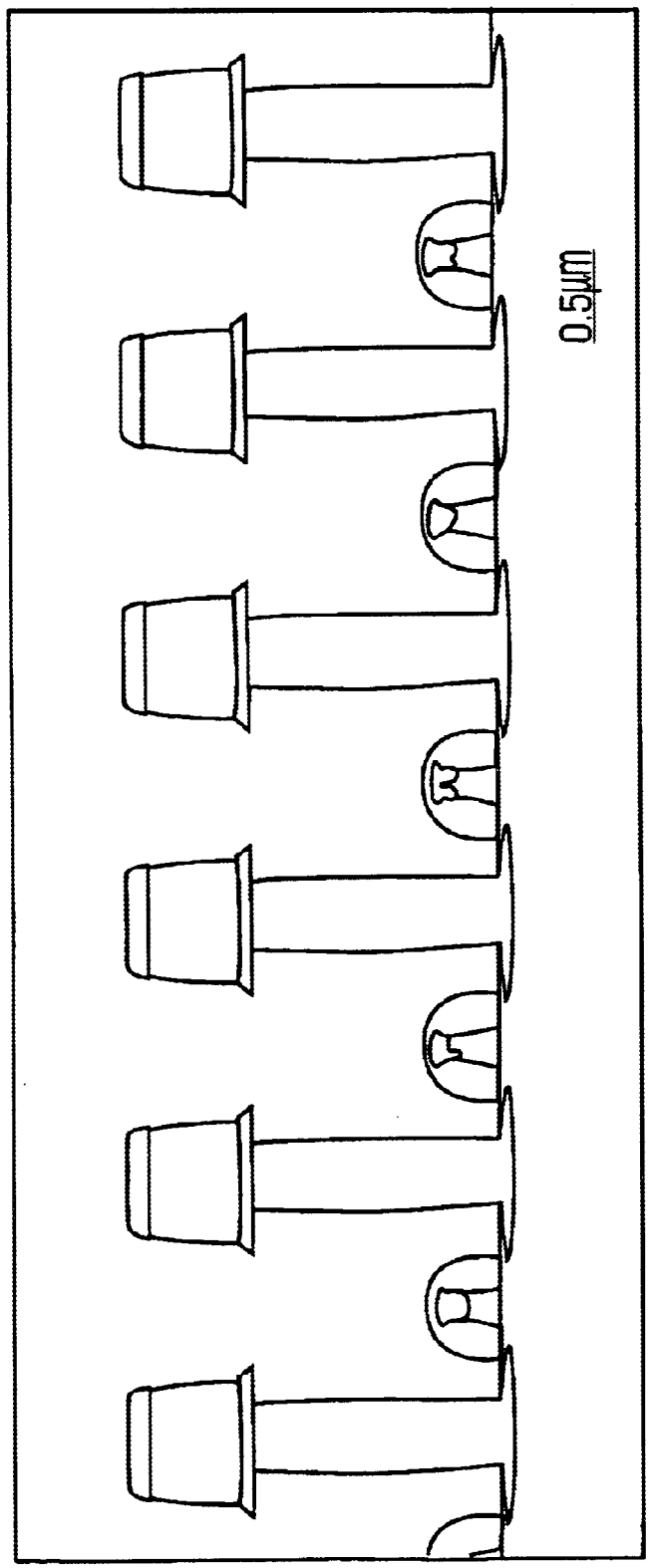
FIG. 33 shows TEM photo of devices according to one embodiment of the present invention.
Figure 34:
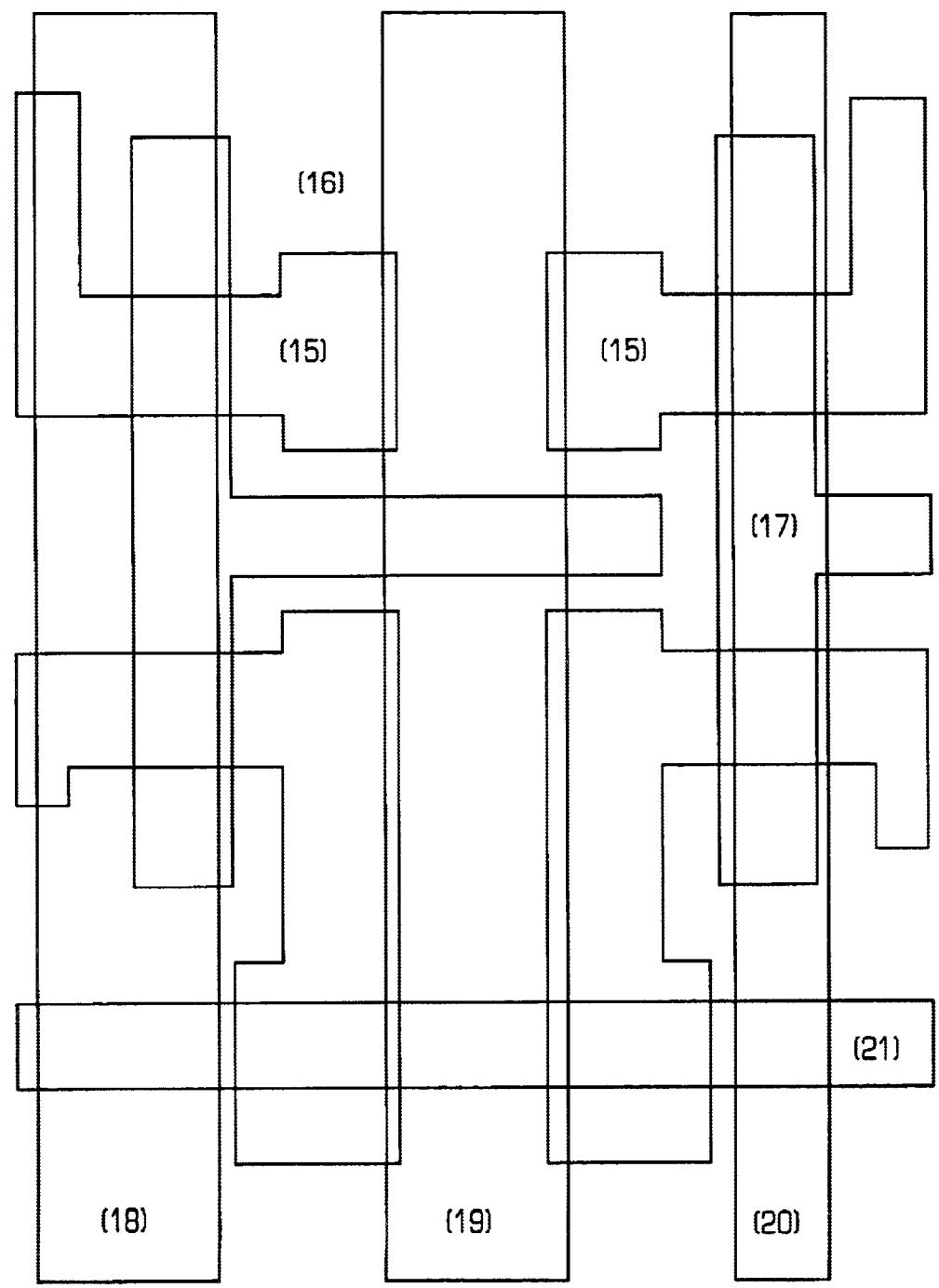
FIG. 34 is a top schematic view of a part of the metal wiring for memory cell patterns according to one embodiment of the present invention.

FIG. 31 shows a schematic perspective view of a three-dimensional process simulation according to one embodiment of the present invention. FIG. 32 shows a schematic cross-sectional view of a device made by the process flow of FIG. 31, according to one embodiment of the present invention. As shown in FIG. 32, a P-well area is formed on a silicon substrate (1). The area (2) shows the p-well. For making STI (shallow trench isolation), a Si RIE (Reactive Ion Etching) process was performed. A typical depth of the trench was 0.8 $\mu$m in this example. After that, the substrate was put into a furnace for oxidation. The temperature was 950° C. in this example. The STI areas are shown in FIG. 31. Moreover, (4) in the figure shows a transistor region. In (4)

of FIG. 32, transistors have gate oxide with a thickness of 64 Å. The doping concentration of the transistor region (4) was $4.3 \times 10^{19}/cm^3$, and the n-channel dopant was boron in this embodiment 1. A polysilicon gate was adopted. The film thickness of the said polysilicon was of 450 Å. The deposition temperature was 625° C. Then a low-pressure CVD film of BPSG (boro-phospho-silicate glass) is disposed on the device, and a pattern is made as shown in (5). The area of (6) in the figure is a high-density TEOS film (abbreviation of chemical name, a kind of $SiO_2$). Using photolithography and etching process, holes were made as shown. Then Ti/CVD/Ti—N film (7) are deposited inside the holes. Moreover, a plug metal (8) are filled in the holes. Number (9) shows A high-density TEOS film (9) has been deposited and made holes as show in the figure. Moreover, in the figure is a TiN film (10) were deposited inside in the said holes, and W-metal were filled in the said holes. Furthermore, Ti/TiN film (12) were deposited on the top. Using photolithography and etching process, holes were made. After that, as shown in FIG. 32, a film (14) was made of TEOS on CVD SiO2 film (13). Typical temperature of deposition of CVD (13) was of 650° C. in this embodiment 1. FIG. 33 shows TEM photo of devices according to one embodiment of the present invention. FIG. 34 is a schematic top view of part of typical memory cell patterns according to one embodiment of the present invention. Numbers (15), (16), and (17) in this figure show parts of silicon field, STI (shallow trench isolation), and polysilicon, respectively. Numbers of (18), (19), and (20) in this figure show parts of metal wiring.

Figure 35:
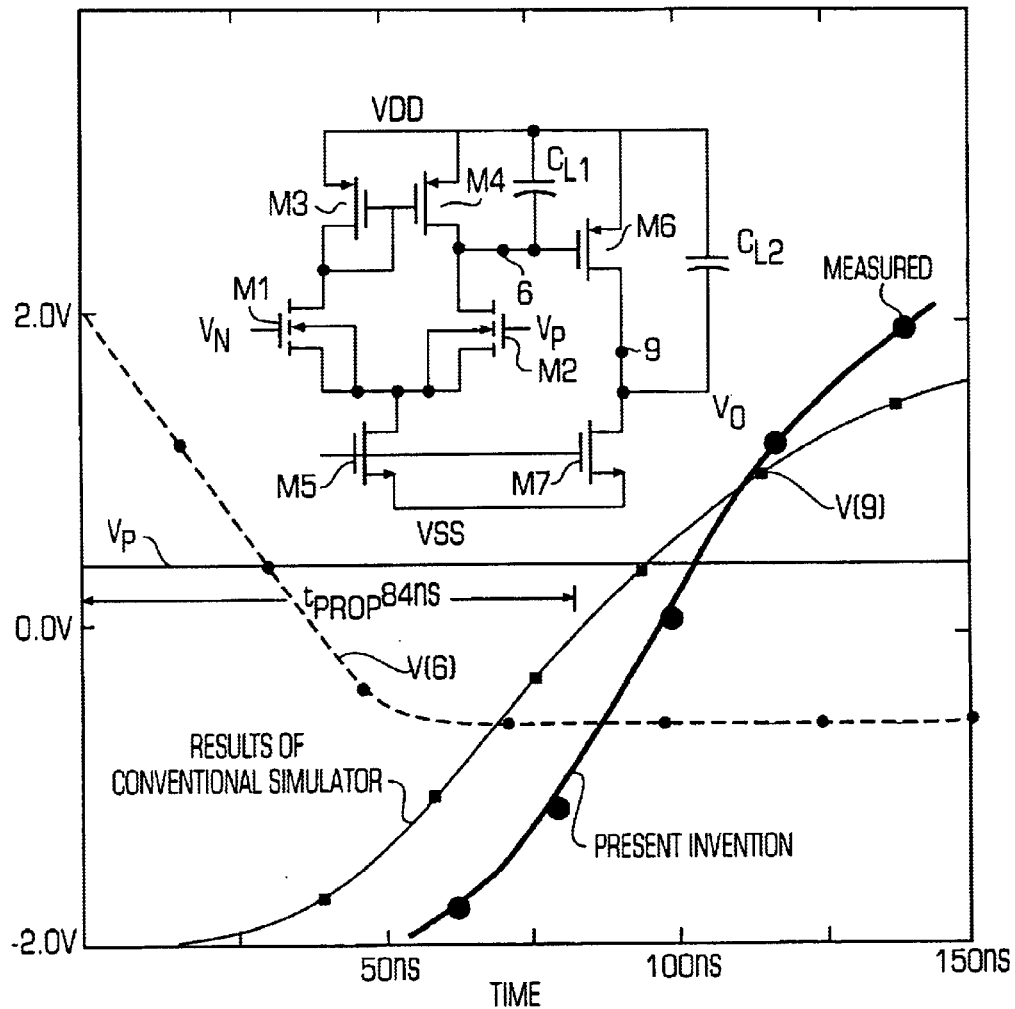
FIG. 35 is a graph showing dynamic response and delay characteristics for conventional simulator and a simulator according to one embodiment of the present invention, and experimental results.

FIG. 35 shows dynamic response and delay characteristics of results of a conventional simulator and a simulator according to one embodiment of the present invention, and experimental results. The results of conventional SPICE simulation of this circuit are also shown in FIG. 35. The calculation delay of the first stage of the SPICE simulation does not so agree with the experimental results. However, according to the present invention, the simulated results closely agree with the experimental results. Moreover, contrary to the method of the present invention, a conventional tool could not provide only qualitative characteristics in scaled circuit. The large discrepancies between conventional SPICE results and experimental results are due to artificial parameter extraction process. As noted above, conventional simulations need definite parameter adjustments. In particular, these convention simulations lead to large misleading models.

Figure 36:
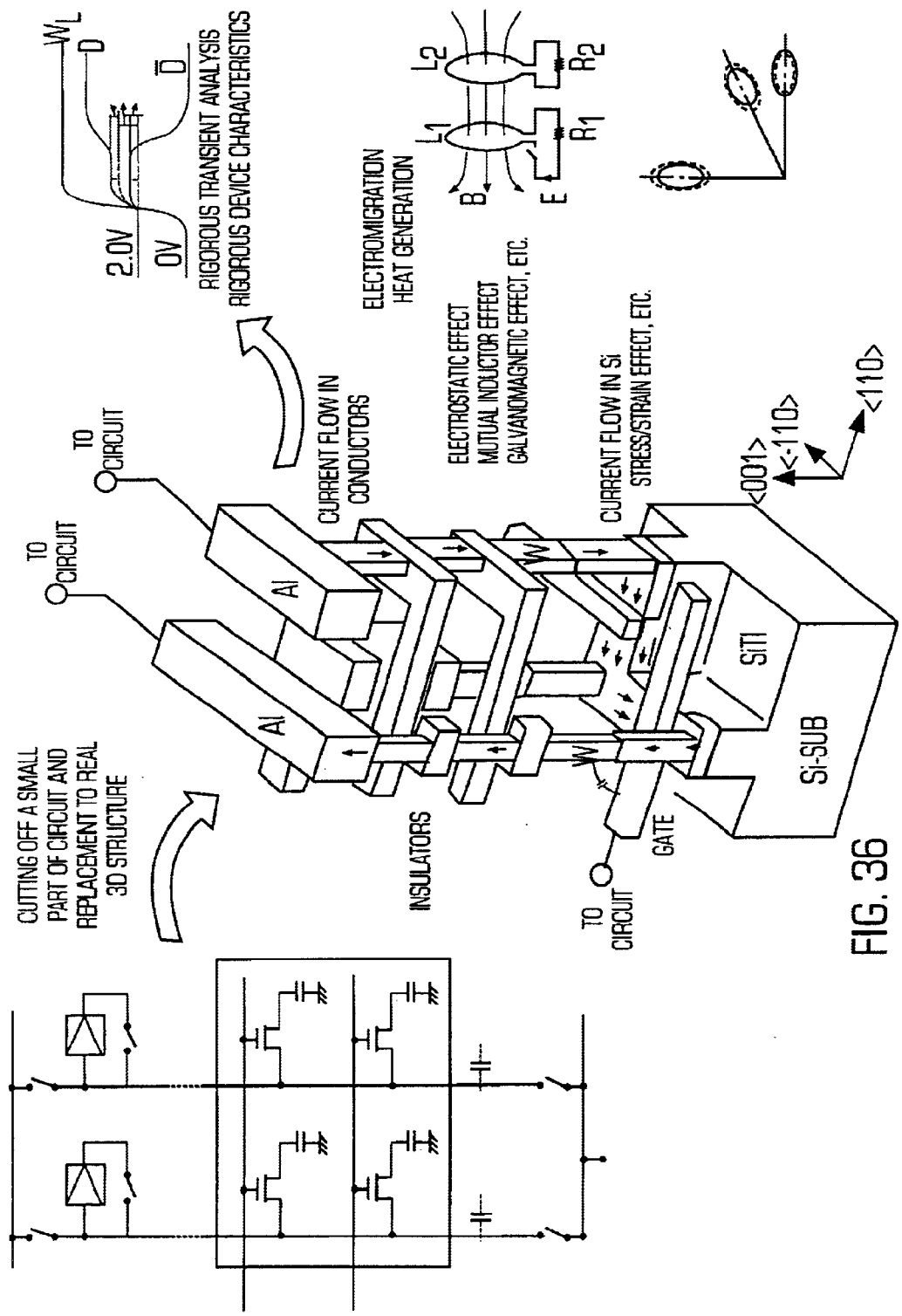
FIG. 36 is a schematic view of present invention.

According to one embodiment of the present invention, peripheral capacitance need not be included, because, in the present invention, charge quantity induced at an interface between conductor and dielectric material is calculated directly by using Maxwell equation. FIG. 36 is a schematic view of present invention.

Figure 37:
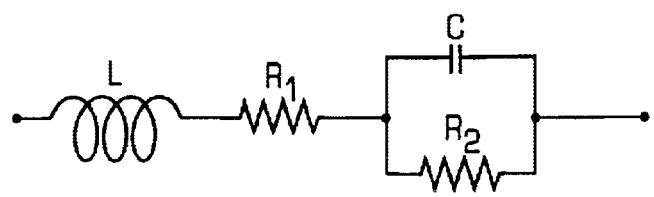
FIG. 37 shows an equivalent circuit image of a typical part of memory cell.

FIG. 37 shows an equivalent circuit image of a typical part of memory cell.

In conventional simulators which predict electric characteristics of semiconductor devices, the simulation region is limited to a small part in a huge 3 dimensional circuit structure, including just a few active devices such as MOSFET, diode, bipolar, and the like. Moreover, electric characteristics are calculated under the condition that interconnects and inter-layer insulators are either neglected or replaced with an equivalent resistor R, condenser C, or inductor coil L. Then, the basic equations used in a conventional simulator are only Poisson equation and carrier transport equations in the semiconductor region.

On the contrary, the simulator of the present invention predicts electric characteristics from the simulation using with whole of the total 3 dimensional structure constructed by plural interconnect regions, plural inter-layer insulator regions and semiconductor regions, and so on directly. Moreover, the simulator of the present invention predicts the electric characteristics considering electromagnetic effects as well as electrostatic effects. Moreover, the simulator of the present invention predicts transient characteristics and AC characteristics as well as steady state characteristics. The simulator of the present invention uses a series of equations including Maxwell's equations, Poisson's equation, an electron continuity equation, a hole continuity equation, an eddy current equation, and an Ohm's law equation as described below to form a new simulation algorithm.

Firstly, a key consideration of the total direct simulation using a huge space including many kind of materials such as semiconductors, interconnect metals, inter-layer insulators, dielectric materials, and the like, is described.

Figure 38:
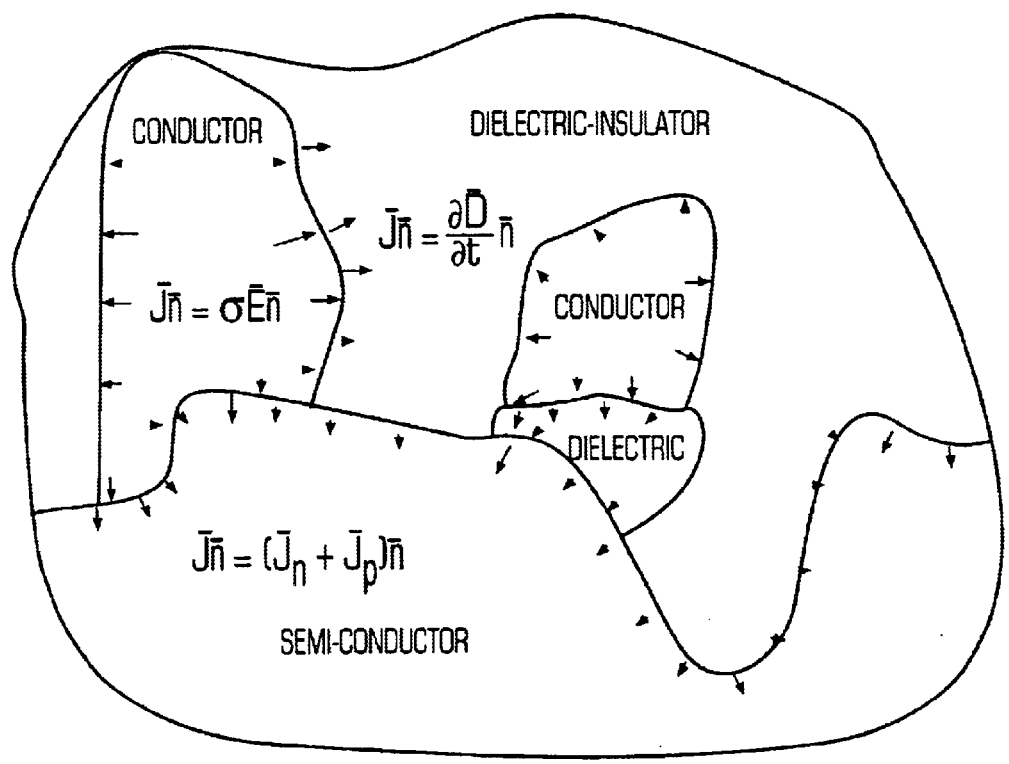
FIG. 38 shows a schematic illustration of 2-dimensional space constructed by metal, dielectrics, dielectric insulators, and semiconductors according to one embodiment of the present invention.

A case in which electromagnetic effects are omitted is described. FIG. 38 shows a schematic illustration of 2 dimensional space constructed by metals, dielectrics, dielectric insulators, and semiconductors. The simulator of the present invention calculates current flows in total structure including many kinds of materials. Therefore, physical models of current flow in each material and at each boundary are examined.

In conductors such as metals, a current J can be described from Ohm's law as $$\vec{J} = \sigma \vec{E} \quad [1]$$

where σ is conductivity. In semiconductors, a current J can be described as a sum of an electron current Jn and a hole current Jp, and may be described by the following Boltzman equations, respectively:

$$\vec{J}_n = q\mu_n \vec{E} n + qD_n \vec{\nabla} n \quad [2]$$

$$\vec{J}_p = q\mu_p \vec{E} p - qD_p \vec{\nabla} p \quad [3]$$

Moreover, the simulator of the present invention uses current flow equations both in dielectric insulators, such as inter-layer insulating film and gate insulating film, and usual dielectric films. From Maxwell equations, the total current density $J_t$ can be written generally as:

$$\vec{J}_t = \vec{J}_f + \frac{\partial \vec{D}}{\partial t} + \vec{\nabla} \times \vec{M} \quad [4]$$

where $J_f$ is a current density associated with free charge, D is electric displacement, M is magnetic dipole moment per unit volume. In one embodiment of the present invention, the term that includes the magnetic dipole moment per unit volume M can be eliminated for dielectrics and insulator. Then equation [4] becomes:

$$\vec{J}_t = \vec{J}_f + \frac{\partial \vec{D}}{\partial t} \quad [5]$$

Considering an electric polarization phenomenon of dielectrics, bound charge density generated by such electric polarization phenomenon can be written as:

$$\rho_b = -\vec{\nabla} \times \vec{P}$$

$$\sigma_b = \vec{P} \cdot \vec{n} \quad [6]$$

where ρb is bound charge in bulk, σb is charge at surface. The term P is electric polarization and the vector n is a normal vector at the surface. The term P can be described electric susceptibility $\chi e$, or relative permittivity $\in r$ as $$\vec{P} = \chi_e \epsilon_0 \vec{E} = (\epsilon_r - 1)\epsilon_0 \vec{E} \quad [7]$$

Using a free charge in bulk as $\rho f$, and a free charge at surface of, Gauss's law becomes:

$$\int_S \vec{E} \cdot da = \int_\tau \vec{\nabla} \cdot \vec{E} d\tau = \frac{Q}{\varepsilon_0} \quad [8]$$

where da means a surface element surface, d$\tau$ means a volume element, and Q means charge.

Since $$Q = \int (\rho_f + \rho_b) d\tau \quad [9]$$

$$\vec{\nabla} \cdot \vec{E} = \frac{\rho_f + \rho_b}{\varepsilon_0} \quad [10]$$

Considering again the electric displacement D. From a relationship $\rho_b = -\vec{\nabla} \cdot \vec{P}$ and an above equation, $$\vec{\nabla} \cdot \vec{E} = \frac{\rho_f - \vec{\nabla} \cdot \vec{P}}{\varepsilon_0},$$

then, the electric displacement D may be expressed by:

$$\vec{D} = \epsilon_0 \vec{E} + \vec{P} \quad [11]$$

$$\vec{\nabla} \cdot \vec{D} = \rho_f$$

Therefore, the current in dielectrics becomes:

$$\vec{J}_t = \frac{\partial \vec{D}}{\partial t} = \frac{\partial}{\partial t}(\varepsilon_0 \vec{E} + \vec{P}) = \frac{\partial}{\partial t} \varepsilon_0 \varepsilon_r \vec{E} \quad [12]$$

In the dielectric insulating film, the current flow is generated only at the surface and Jt=0 in the bulk region. From these physical considerations, all of the current in conductors, semiconductors, dielectric materials, and insulators can be described by the equations using the electric field E. Then, if electric field can be predicted precisely in the total 3 dimensional structure, the current density in the whole structure could be predicted. In other words, from the calculation of Poisson equation:

$$\vec{\nabla} \cdot \vec{D} = \rho_f (\vec{\nabla} \cdot (\epsilon \vec{E}) = \rho_f) \quad [13]$$

in the whole region, electric field, charge and current in the whole region can be predicted. Then, a precise electric characteristic including parasitic effects and peripheral effects can be obtained. When a Poisson equation is calculated, it is assumed the current is conserved at each interface. This assumption at an interface between metal and semiconductor means Ohmic contact. If the interface is treated as a Shottky interface, a small revision is made.

In the case of Ohmic contact, it is assumed that the normal component of current flow is conserved at the interface, and is represented by the equation [14] as follows:

$$\vec{J}_{conductor} \cdot \vec{n} = (\vec{J}_n + \vec{J}_p) \cdot \vec{n} \quad [14]$$

$$\sigma \vec{E}_{conductor} \cdot \vec{n} = (q\mu_n n \vec{E}_{semiconductor} + q\mu_p p \vec{E}_{semiconductor}) \cdot \vec{n} \quad [4]$$

In equation [14], the left term means a current density at the conductor side, the right term is a current density at the semiconductor side. At the interface between a conductor and a dielectric insulator, it is assumed that $$\vec{J}_{conductor} \cdot \vec{n} = \vec{J}_{insulator} \cdot \vec{n} \quad [15]$$

$$\sigma \vec{E}_{conductor} \cdot \vec{n} = \frac{\partial \vec{D}_{insulator}}{\partial t} \cdot \vec{n}$$

$$= \frac{\partial \varepsilon \vec{E}_{insulator}}{\partial t} \cdot \vec{n}$$

In equation [15], the left term means a current density at the conductor side, the right term means a current density at the dielectric-insulator side. At other interfaces between semiconductor and dielectric insulator, plural conductors, plural insulators, a similar treatment is done.

The boundary conditions of tangential components were derived from $\int_L \vec{E} dl = 0$ such as $$E_{tan,1} L - E_{tan,2} L = 0$$

$$E_{tan,1} = E_{tan,2} \quad [16]$$

Figure 39:
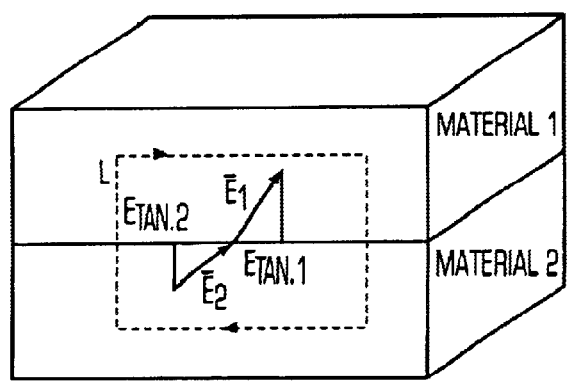
FIG. 39 shows a boundary condition in 3-dimensional space according to one embodiment of the present invention.

Notations are shown in FIG. 39, which shows a boundary condition in three-dimensional space according to one embodiment of the present invention. The validation of equation [16] for metal/semiconductor interface at which work functions are different has been confirmed. The series of steady state and transient condition equations are for the simulator summarized in FIG. 40.

Figure 41:
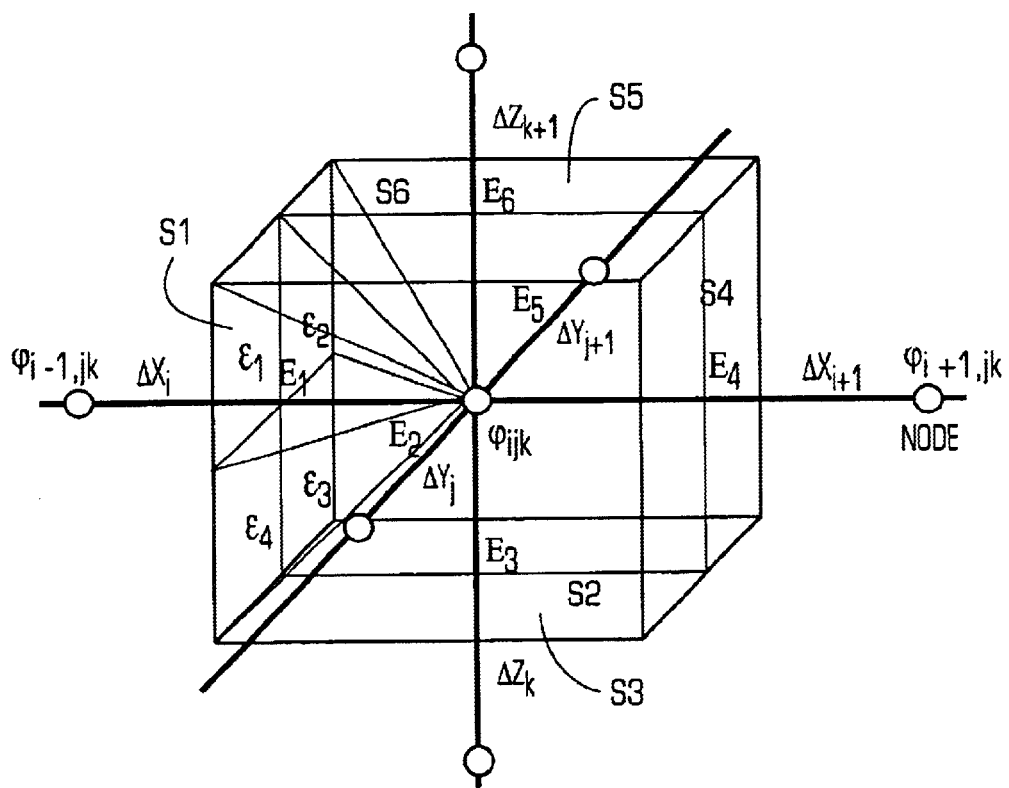
FIG. 41 is a diagram illustrating a three-dimensional discretization volume element according to one embodiment of the present invention.

FIG. 41 is a diagram illustrating a three-dimensional discretization volume element according to one embodiment of the present invention. Each discretization volume element has dimensions $\Delta x$, $\Delta y$, $\Delta z$ along the x-axis, y-axis, and z-axis, respectively. The volume element has surface elements Si (i=1, 2, 3, 4, 5, 6). The electric field on a surface i is $\epsilon i$. The element has a potential $\Phi ijk$ and has a dielectric constant $\epsilon i$. Using equations (1)–(16), the simulator calculates the characteristics for each volume element of the device and thus determines the device characteristics.

What is claimed is:

1. An electronic circuit design simulator comprising:
   a three dimensional lump device element part configured to predicted lump device charateristics;
   a three-dimensional visco-elastic process simulation part interlinked with the three-dimensional lumped device element part; and
   a material design part interlinked with the three-dimensional lumped device element part and the three-dimensional visco-elastic process simulation part,
   wherein the three-dimensional lump device element part determines three dimensional device characteristics in response to elastic stiffness information from the material design part and provides level information to the material design part.

2. The electronic circuit design simulator of claim 1 wherein the three-dimensional visco-elastic process simulation part provides at least one of the group of stress distribution, device structure and impurity profiles to the lump device element part.

3. The electronic circuit design simulator of claim 1, wherein the three-dimensional visco-elastic process simulation part comprises:
   a visco-elastic model for device material;
   a non-equilibrium point-defect diffusion model; and
   an anisotropic Young modulus model.

4. The electronic circuit design simulator of claim 1, wherein the three-dimensional visco-elastic process simulation part comprises:
    means far simulating a metal deposition process;
    means for simulating a metal etching process;
    means for simulating a silicon substrate oxidation process;
    means for simulating poly-silicon film oxidation process;
    means for simulating an ion implantation process; and
    means for simulating an impurity diffusion process.

5. The electronic circuit design simulator of claim 1, wherein the three-dimensional visco-elastic process simulation part comprises means for predicting anisotropic residual stress.

6. The electronic circuit design simulator of claim 1, wherein the three-dimensional lump device element part comprises:
    a Poisson's equation model;
    an electron continuity equation model;
    a hole continuity equation model;
    a Maxwell's equations model;
    an eddy current equation model; and
    an Ohm's law equation model.

7. The electronic current design simulation of claim 1 wherein the tree-dimensional lump device element includes an electric and magnetic field discretization model.

8. The electronic circuit design simulator of claim 1, wherein the three-dimensional visco-elastic process simulation part provides at least one of structure information and impurity information to the three-dimensional lumped device element part in response to at least one of stress information elastic stiffness and impurity diffusivity from the material design part, and the three-dimensional lumped device element part provides field level information to the material design part in response to said at least one of structure information and impurity information and in response to at least one of dielectric and impurity concentration information from the material design part.

9. An electronic circuit simulator comprising:
    a mask pattern process sequence model;
    a material simulator,
    a three-dimensional process simulator coupled to the musk pattern sequence model and the material simulator; and
    a device equation model configured to simulate an operation of a lump device and coupled to the three-dimensional process simulator executing circuit operation model equations in response to the three-dimensional process simulator,
    wherein the device equation model includes a conductor equation model having a transient condition equation model and a steady state condition model, a semiconductor equation model having a transient condition equation model and a steady state equation model, and a dielectric equation model having a transient condition model and a steady state condition model.

10. The electronic circuit simulator of claim 9, wherein the device equation model includes equations 1–16.

11. The electronic circuit simulator of claim 9, wherein the equation model includes the equations of FIG. 40.

12. An electronic circuit design simulator comprising:
    a three-dimensional lump device element part configured to predict lump device characteristics;
    a three-dimensional visco-elastic process simulation part interlinked with the three-dimensional lumped device element part; and
    a material design part interlinked with the three-dimensional lumped device element part and the three-dimensional visco-elastic process simulation part,
    wherein the three-dimensional lump device element part comprises a Poisson's equation model, an electron continuity equation model, a hole continuity equation model, a Maxwell's equations model, an eddy current equation model, and a Ohm's law equation model.

* * * * *